(12) United States Patent  (10) Patent No.:  US 7,218,019 B2
Potter                         (45) Date of Patent:         May 15, 2007

(54) LINEAR RELUCTANCE MOTOR

(75) Inventor: Steven D. Potter, Bedford, MA (US)

(73) Assignee: Foster-Miller, Inc, Waltham, MA (US)

( * ) Notice: Subject to any disclaimer, the term of this patent is extended or adjusted under 35 U.S.C. 154(b) by 268 days.

(21) Appl. No.: 10/726,420

(22) Filed: Dec. 3, 2003

(65) Prior Publication Data

US 2004/0217657 A1    Nov. 4, 2004

Related U.S. Application Data

(60) Provisional application No. 60/431,604, filed on Dec. 6, 2002.

(51) Int. Cl.
*H20K 41/00* (2006.01)

(52) U.S. Cl. .............. 310/12; 310/156.56; 310/156.01; 310/112

(58) Field of Classification Search .................. 310/12, 310/13, 15, 156.56, 156.01, 156.53, 112; H02K 41/00
See application file for complete search history.

(56) References Cited

U.S. PATENT DOCUMENTS

| 3,992,641 | A | | 11/1976 | Heinrich et al. | |
| 4,864,169 | A | | 9/1989 | Rioux et al. | |
| 4,912,343 | A | * | 3/1990 | Stuart | 310/14 |
| 5,495,131 | A | * | 2/1996 | Goldie et al. | 310/12 |
| 5,751,089 | A | * | 5/1998 | Stridsberg | 310/266 |
| 5,831,353 | A | * | 11/1998 | Bolding et al. | 310/12 |
| 6,670,730 | B2 | * | 12/2003 | Bartolotti | 310/12 |
| 6,940,190 | B2 | * | 9/2005 | Jobson et al. | 310/12 |

* cited by examiner

*Primary Examiner*—Karl Tamai
*Assistant Examiner*—I. A. Mohandesi
(74) *Attorney, Agent, or Firm*—Iandiorio & Teska

(57) ABSTRACT

A linear reluctance motor including a stator with a set of spaced blades each extending in the direction of the actuation axis, each blade including a plurality of alternating low permeability and high permeability teeth. A shuttle also includes a set of spaced blades each extending in the direction of the actuation axis interleaved with the blades of the stator, each blade of the shuttle also including a plurality of alternating low permeability and high permeability teeth. An active component is associated with either the stator, the shuttle, or both. The active component is divided into at least N phases, each phase including a set of blades, a flux return portion, and a coil wound to produce flux through the sets of interleaved blades in a direction substantially transverse to the actuation axis.

74 Claims, 28 Drawing Sheets

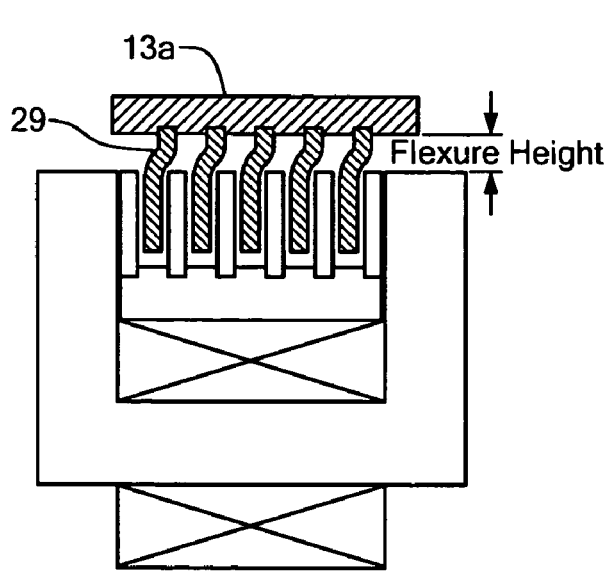
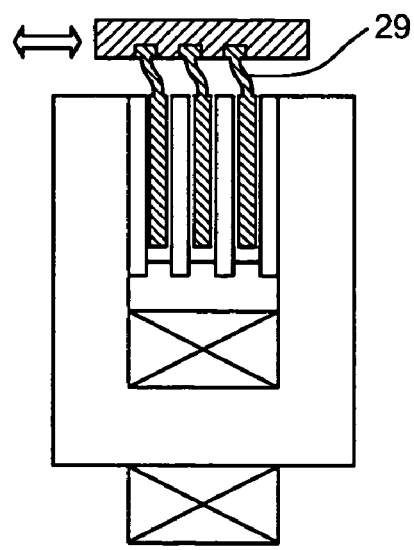
*FIG. 12*  *FIG. 13*
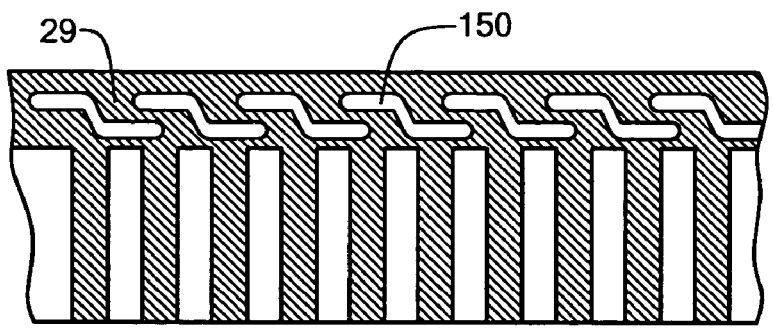
*FIG. 14*
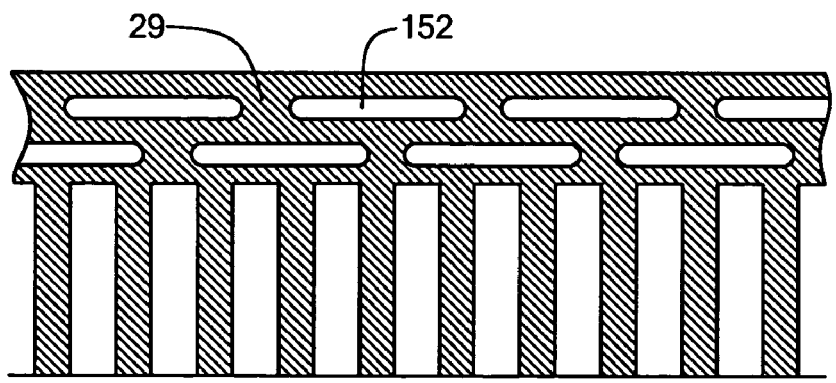
*FIG. 15*

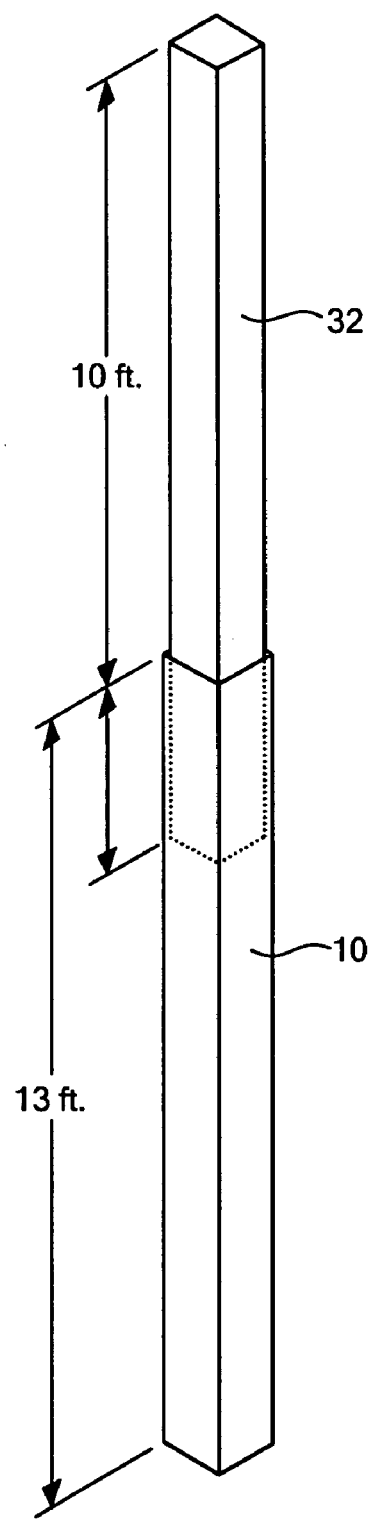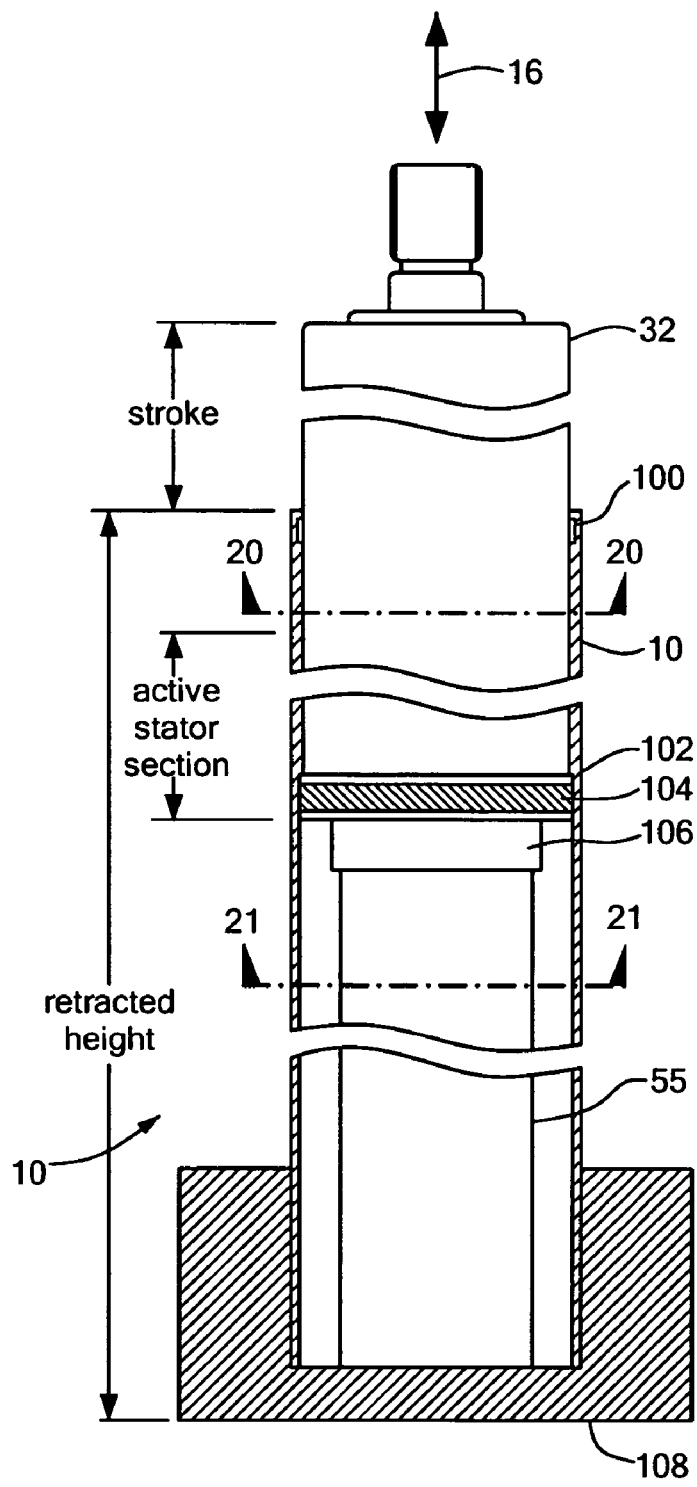
FIG. 18
FIG. 19

LINEAR RELUCTANCE MOTOR

RELATED APPLICATIONS

This application claims priority from provisional application Ser. No. 60/431,604 filed Dec. 6, 2002.

FIELD OF THE INVENTION

This invention relates to a linear reluctance motor.

BACKGROUND OF THE INVENTION

Conventional electric motors, both rotary and linear, have very poor torque and force density. For heavy lifting applications, mechanical means such as gears and screws are more typically used. Fluidic devices including pneumatic and hydraulic systems are also used. These mechanical methods generally involve noise, wear, backlash, poor shock tolerance, and high reflected inertia. The fluidic methods tend to increase system complexity due to the addition of a fluid system. Fluid systems are also harder to control than electric systems. Due to seal wear, the fluid methods are unreliable and can contaminate sensitive environments when the working fluid leaks.

A polyphase disc reluctance rotary motor is shown in U.S. Pat. No. 3,992,641 incorporated herein by this reference.

Most prior art linear motors operating on the principle of magnetism, however, include permanent magnets or are classified as inductance machines. U.S. Pat. No. 4,864,169, also incorporated herein by this reference, discloses a linear reluctance motor but it is configured such that the magnetic flux produced extends in the direction of the actuation axis. Such a design, however, results in a fairly low force density.

Thus, there exists a need for a high force density linear reluctance motor.

SUMMARY OF THE INVENTION

It is therefore an object of this invention to provide a linear reluctance motor.

It is a further object of this invention to provide such a linear reluctance motor which exhibits a high force density.

It is a further object of this invention to provide such a linear reluctance motor which can be configured into a number of different designs depending on the specific application.

The invention results from the realization that a better linear reluctance motor is effected by orienting the windings of the coils to produce flux through a set of interleaved blades of the stator and shuttle in a direction substantially transverse to the actuation axis. Also, by making the blades relatively thin, the blade density can be increased resulting in a large force density. The conventional wisdom is that each blade must be sufficiently thick and stiff to support itself and/or that the gaps between the blades must be large. The truth is that in a relatively slow moving motor, the blades can actually touch and rub against each other. With smaller gaps between the blades, there is less attractive force between the blades resulting less friction. And, the added benefit of reducing the extent of the gaps between the blades is reduced losses and less coil current required to generate the necessary flux.

This invention features a linear reluctance motor having an actuation axis, the linear reluctance motor comprising a stator including a set of spaced blades each extending in the direction of the actuation axis, each blade including a plurality of alternating low permeability and high permeability teeth, a shuttle also including a set of spaced blades each extending in the direction of the actuation axis interleaved with the blades of the stator, each blade of the shuttle also including a plurality of alternating low permeability and high permeability teeth, and an active component associated with either the stator, the shuttle, or both, the active component divided into at least N phases, each phase including a set of blades, a flux return portion, and a coil wound to produce flux through the sets of interleaved blades in a direction substantially transverse to the actuation axis. Typically, N is at least three.

In one example, the stator defines a housing with a channel for receiving the shuttle therein. The channel may be C-shaped or the channel may be fully enclosed. In another example, the shuttle is telescopingly received in the stator.

The phases may be in series along the actuation axis or arranged laterally with respect to the actuation axis or arranged both axially and laterally with respect to the actuation axis.

There may be a large gap between the interleaved blades or a small gap between the interleaved blades.

In one particular embodiment, the active component is associated with the stator and the phases are in series along the actuation axis. In this example, the stator defines a housing with a channel for receiving the shuttle therein, the blades of the shuttle extend into the channel and the blades of the stator are interleaved with the blades of the shuttle. The shuttle includes a blade carrier disposed outside the channel. A bearing assembly may be located between the blade carrier and the stator housing. There may be a large gap between the outermost blades of the shuttle and the stator housing. The large gap may be effected by tapered side walls of the shuttle housing. Alternately, the blades of the stator and the blades of the shuttle are flexible and closely spaced or the blades of the shuttle are flexible and closely spaced to the blades of the stator.

In one particular example, the blades of the shuttle have a thinned blade root. In another example, the blades of the shuttle have a slotted blade root.

In another particular embodiment, the active component is associated with the stator which has, for each phase, an opposing set of blades, a coil therebetween, and a flux return plate. In this embodiment, the phases are arranged in series along the actuation axis. The stator includes a housing surrounding the blades and the flux return plates and the shuttle includes a housing telescopingly received in the stator housing.

In another particular embodiment, the active component is associated with the shuttle and the phases are arranged in series along the actuation axis. The stator defines a housing with a channel for receiving the shuttle therein, the blades of the stator extend into the channel, and the blades of the shuttle are interleaved with the blades of the stator. The stator housing includes a longitudinal slot and the shuttle includes a fin extending through the slot connected to a driving element located outside the channel.

In another particular embodiment, the active component is associated with the stator and the phases are arranged laterally. The stator defines a housing with a channel for receiving the shuttle therein, the blade sets of the stator are adjacent each other across the channel, and the blade sets of the shuttle are adjacent each other across the channel. The blade sets of the shuttle extend into the channel from a carrier. A sliding shutter may be attached to the carrier for sealing the channel of the stator. In another particular embodiment, the active component is associated with the shuttle which includes phases distributed axially and laterally. The stator includes a housing defining a channel therein, and at least a pair of adjacent blade sets opposing another pair of adjacent blade sets. The shuttle includes at least a first pair of adjacent blade sets opposing a second pair of adjacent blade sets defining two phases and a third pair of adjacent blade sets opposing a fourth pair of adjacent blade sets defining two additional phases.

In other embodiments, the active component is associated with the shuttle which travels within the stator and connected to a carriage external to the stator by a cable and pulley subsystem. The stator may be active and include phases in series along the actuation axis and the shuttle is telescopingly received in the stator. In one example, the stator has a set of opposing outwardly extending blades for each phase and the shuttle has a sets a set of opposing inwardly extending blades.

In some embodiments, the teeth are straight. In other examples, the teeth are angled. Each tooth may be a laminate construction. In one example, each blade is formed from a low permeability material and the high permeability teeth are formed by adding high permeability material to the low permeability material of the blade. In another example, each blade is formed from a high permeability material and the low permeability teeth are formed by adding low permeability material to the high permeability material of the blade. Each blade may include a reinforcing layer on the outside thereof. In one example, each blade includes a high permeability coupon bonded to a low permeability coupon.

Further included may be vacuum compensation means for allowing the shuttle to be actuated without contaminating the blades.

The interleaved blades of the linear reluctance motor define an average gap between the blades and also define an outer gap. In one embodiment, the outer gap is larger than the average gap. For example, the outer gap may be between the outer blades of the shuttle and the outer blades of the stator. Or, the outer blades of the shuttle are flexible in lateral bending. In another example, the outer gap is between the outer blades of the stator and the flux return portions and the flux return portion tapers outwardly away from the outer blades of the stator. In one embodiment, the blades of the shuttle and/or the stator have a thinned blade root or a slotted blade root.

In one embodiment, the linear reluctance motor stator defines a housing with a longitudinal slot and the shuttle includes a fin extending through the slot. In another embodiment, the stator defines a channel and further included is a sliding shutter for sealing the channel of the stator. In one example, the shuttle is telescopingly received in the stator and the active component is supported by a structural beam. In another example, the shuttle and the stator define inner and outer telescoping tubes. The inner tube is connected to the active component and the passive blades are connected to a structural beam connected on one end to the outer tube. In still another example, at least one push rod extends from the shuttle. In another example, a tension element is connected to the shuttle.

In some embodiments, the shuttle is shorter than the stator. In other embodiments, the shuttle is longer than the stator.

Conductors for powering the coils may be stationary with respect to the active component or, alternatively, extensible.

In one particular embodiment, the active component is associated with the stator, the stator is attached to a structural tube, the blades of the shuttle connect to a structural beam, said beam is attached at the end to a tubular housing which is telescopingly connected to said structural tube, and said tubular housing is external to said structural tube. Alternatively, at least one phase is divided into at lease two magnetic circuits, each circuit having a coil, a flux-return a blade-set, said flux-returns being inwardly opposed so as to minimize leakage flux. In one example, the length of the interleaved portion of the stator and shuttle blades changes as the shuttle moves. In another example, the shuttle is relatively short and the stator long, the active component is associated with the stator, the phases are arranged serially along the axis of actuation, the blades of shuttle substantially overlaps at least three phases, and the stator has more phases than can be engaged by the shuttle at any given position.

This invention also features a linear reluctance motor comprising a stator divided into N phases in sets, each phase including a set of opposing spaced blades extending in the direction of the actuation axis and outwardly towards a stator housing. Each phase includes a coil wound to produce flux in a direction substantially transverse to the actuation axis, and a flux return plate on each end of the coil. A shuttle includes a set of opposing spaced blades extending in the direction of the actuation axis and inwardly from a shuttle housing to interleave with the blades of the stator. The shuttle housing is telescopingly received in the stator housing. One possible linear reluctance motor in accordance with this invention features a stator including a set of spaced blades each extending in the direction of the actuation axis, each blade including a plurality of alternating low permeability and high permeability teeth. A shuttle also includes a set of spaced blades each extending in the direction of the actuation axis interleaved with the blades of the stator, each blade of the shuttle also including a plurality of alternating low permeability and high permeability teeth. The active component is associated with the stator, the active component is divided into at least N phases in series and each phase includes a set of blades, a flux return portion, and a coil wound to produce flux through the sets of interleaved blades in a direction substantially transverse to the actuation axis. The stator defines a housing with a channel for receiving the shuttle therein, the blades of the shuttle extending into the channel and the blades of the stator interleaved with the blades of the shuttle.

Another linear reluctance motor in accordance with this invention features a stator including a set of spaced blades each extending in the direction of the actuation axis, each blade including a plurality of alternating low permeability and high permeability teeth, a shuttle also including a set of spaced blades each extending in the direction of the actuation axis interleaved with the blades of the stator, each blade of the shuttle also including a plurality of alternating low permeability and high permeability teeth, and an active component associated with the shuttle, the active component divided into at least N phases in series, each phase including a set of blades, a flux return portion, and a coil wound to produce flux through the sets of interleaved blades in a direction substantially transverse to the actuation axis. The stator defines a housing with a channel for receiving the shuttle therein, the blades of the stator extending into the channel and the blades of the shuttle interleaved with the blades of the stator. Still another linear reluctance motor in accordance with this invention features a stator including a set of spaced blades each extending in the direction of the actuation axis, each blade including a plurality of alternating low permeability and high permeability teeth, a shuttle also including a set of spaced blades each extending in the direction of the actuation axis interleaved with the blades of the stator, each blade of the shuttle also including a plurality of alternating low permeability and high permeability teeth, and an active component associated with the stator. The active component is divided into at least N phases arranged laterally, each phase includes a set of blades, a flux return portion, and a coil wound to produce flux through the sets of interleaved blades in a direction substantially transverse to the actuation axis. The stator defines a housing with a channel for receiving the shuttle therein, the blade sets of the stator adjacent each other across the channel, and the blade sets of the shuttle adjacent each other across the channel.

A linear reluctance motor in accordance with this invention may include a stator including a set of spaced blades each extending in the direction of the actuation axis, each blade including a plurality of alternating low permeability and high permeability teeth and a shuttle also including a set of spaced blades each extending in the direction of the actuation axis interleaved with the blades of the stator, each blade of the shuttle also including a plurality of alternating low permeability and high permeability teeth. The active component associated with the shuttle, the active component divided into at least N phases distributed axially and laterally, and each phase includes a set of blades, a flux return portion, and a coil wound to produce flux through the sets of interleaved blades in a direction substantially transverse to the actuation axis. The stator includes a housing defining a channel therein, and at least a pair of adjacent blade sets opposing another pair of adjacent blade sets and the shuttle includes at least a first pair of adjacent blade sets opposing a second pair of adjacent blade sets defining two phases and a third pair of adjacent blade sets opposing a fourth pair of adjacent blade sets defining two additional phases.

BRIEF DESCRIPTION OF THE DRAWINGS

Other objects, features and advantages will occur to those skilled in the art from the following description of a preferred embodiment and the accompanying drawings, in which:

FIG. 12 is a schematic cross-sectional view showing flexible shuttle blades in accordance with the subject invention;

FIG. 13 is a schematic partial cross-sectional view showing shuttle blades with thinned down blade roots in order to provide flexibility in accordance with the subject invention;

FIG. 14 is a schematic side view of a blade with slots in the blade root in order to provide flexibility;

FIG. 15 is a schematic side view of a blade also with slots in the blade root in order to provide flexibility;

FIG. 18 is a schematic three-dimensional view also showing the combination of an exemplary stator and shuttle for a reluctance motor in accordance with the subject invention;

FIG. 19 is a schematic side view of another version of a linear reluctance motor in accordance with the subject invention;

DISCLOSURE OF THE PREFERRED EMBODIMENT

Figure 1:
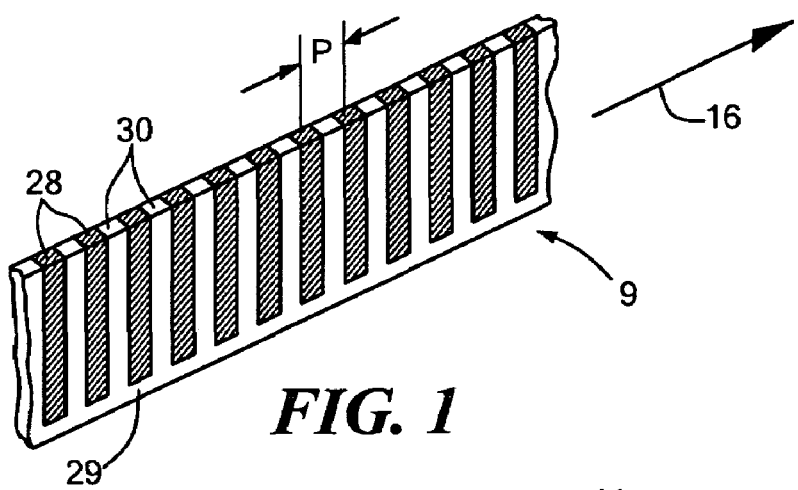
FIG. 1 is a schematic three-dimensional view of a single blade in accordance with the subject invention.

Aside from the preferred embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings.

FIG. 1 depicts a single blade 9 including a plurality of alternating high permeability teeth 28 and low permeability teeth 30 extending from blade root 29 and defining pitch P. In FIG. 1, teeth 28 and 30 extend perpendicular to the longitudinal axis of the blade but this is not a necessary limitation of the subject invention as discussed infra. Also, the longitudinal axis of the blade is the actuation axis 16 as defined herein.

Figure 2:
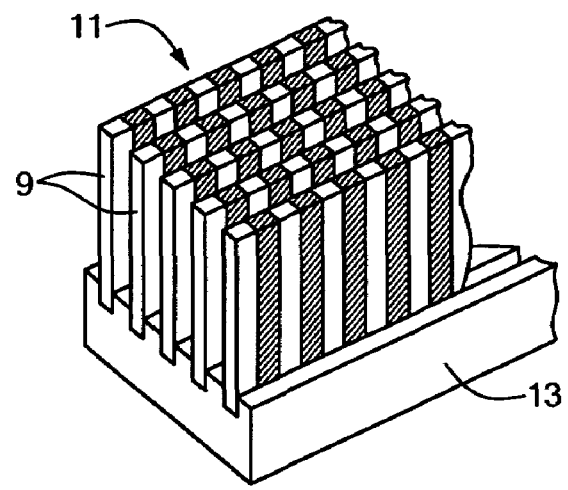
FIG. 2 is a schematic three-dimensional view of a blade set in accordance with the subject invention.
Figure 3:
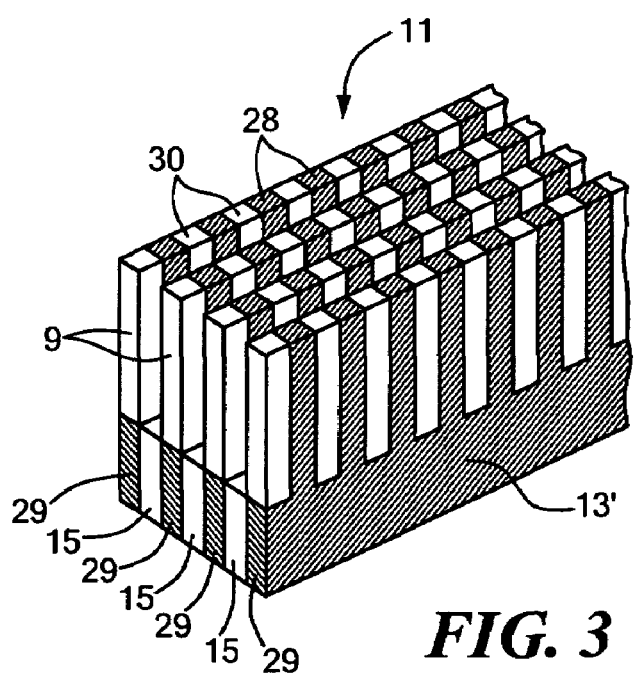
FIG. 3 is a schematic three-dimensional view of another embodiment of a blade set in accordance with the subject invention.

FIG. 2 depicts a single blade set 11 including blades held in place by blade carrier or plate 13. FIG. 3 shows an alternative type of carrier 13' where non-magnetic spacers 15 separate blade roots 29.

Regions of low-permeability 30 between teeth 28 may be filled with a low-permeability structural material including, but not limited to, polymers, ceramic-filled polymers, metal-filled polymers, fiber-filled polymers, ceramics, metal-filled ceramics, and low-permeability metals such as aluminum, brass and stainless-steel.

Figure 4:
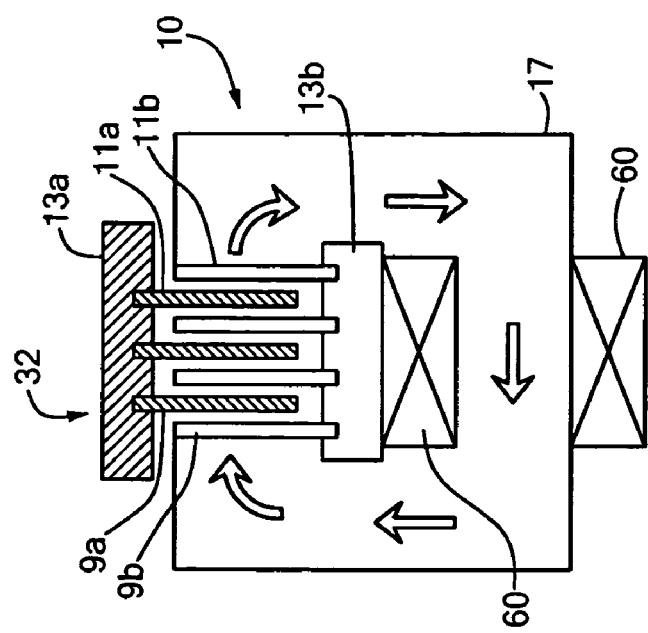
FIG. 4 is a schematic cross-sectional view of a linear reluctance motor in accordance with the subject invention wherein the active component is associated with the stator which includes three phases serially arranged.

One version of a linear reluctance motor in accordance with the subject invention includes shuttle 32, FIG. 4 and stator housing 10 defining a channel for receiving shuttle 32 therein. As used herein, the "shuttle" is typically the moving component while the stator component is the fixed in place component but those skilled in the art will understand that if, in any embodiment described herein, the "shuttle" is held fixed, then the stator becomes the moving component or that even both the stator and the shuttle may move in some embodiments or applications.

Figure 6:
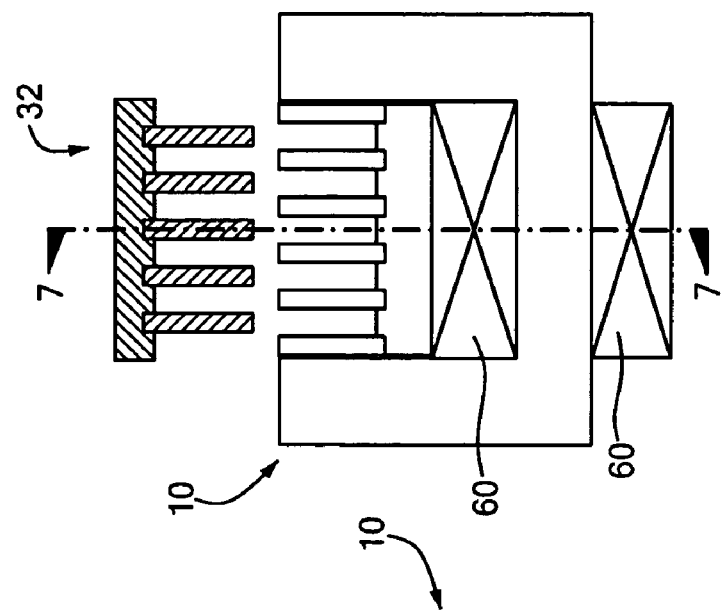
FIG. 6 is a schematic cross-sectional exploded view of the linear reluctance motor shown in FIGS. 4 and 5.
Figure 5:
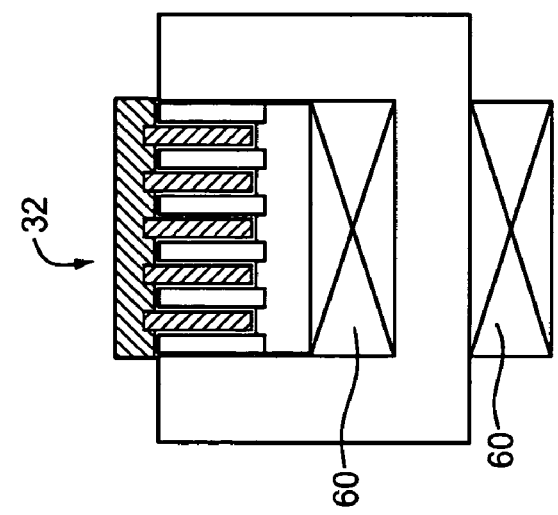
FIG. 5 is a schematic cross-sectional view similar to FIG. 4.

In FIG. 4, shuttle 32 includes blade carrier 13a disposed outside the C-shaped channel defined by stator housing 10, and blade set 11a extending into the channel of stator housing 10. Here, blade carrier 13a may serve as the carriage which drives other structure(s) attached thereto in a linear fashion. Interleaved with the blades 9a of shuttle blade set 11a are the blades 9b of stator blade set 11b. In this embodiment, the active component of the motor is associated with stator 10 which includes three phases arranged serially along the actuation axis. Each phase includes flux return portion 17 and coil 60 wound to produce flux through the sets of interleaved blades 9a and 9b in a direction transverse to the actuation axis of the motor. FIGS. 5–6 provide similar views to that of FIG. 4.

Figure 7:
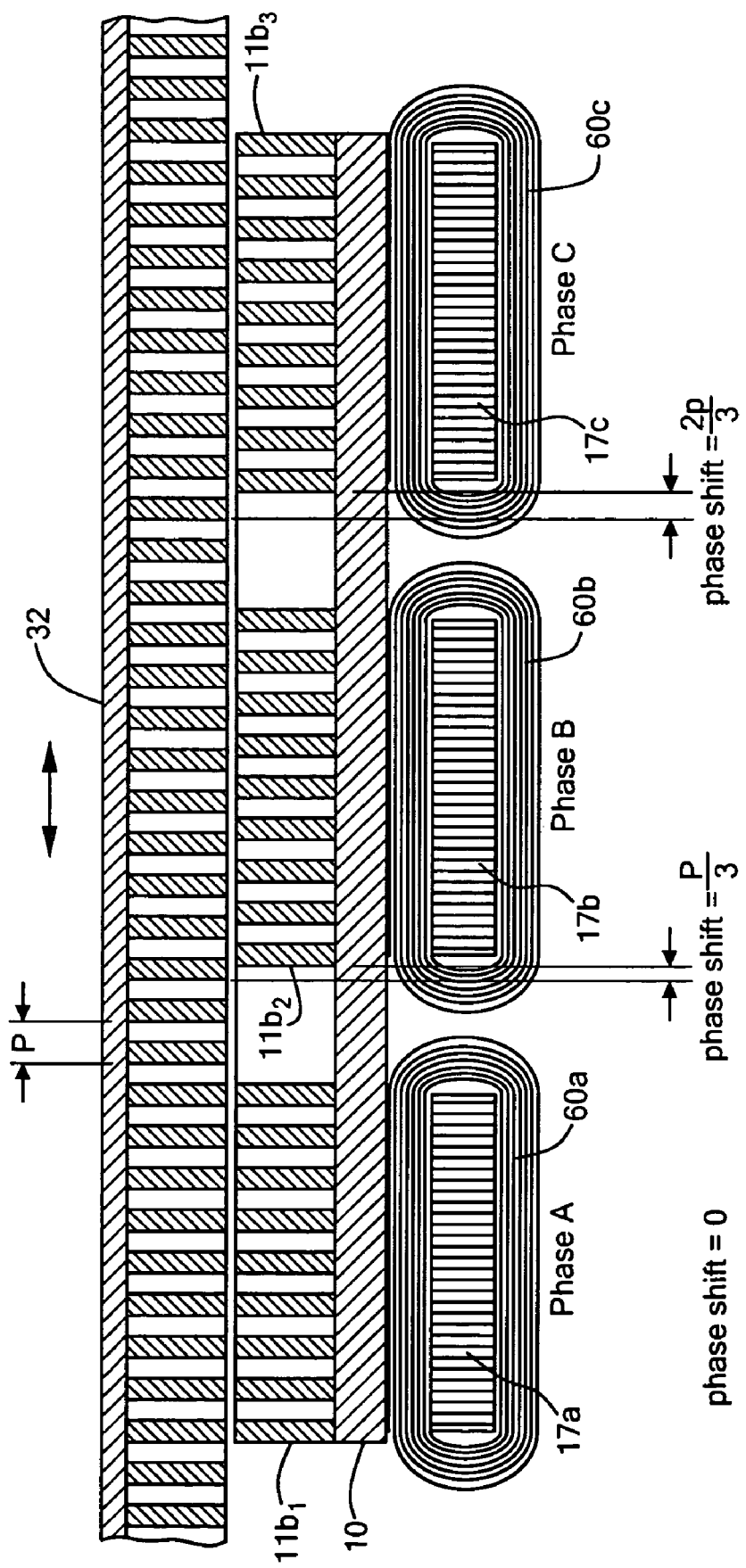
FIG. 7 is a sectional view taken along line 7—7 of FIG. 6.

FIG. 7 shows the three serially arranged phases A, B, and C of stator 10 each including a coil 60a, 60b, and 60c, a blade set 11b$_1$, 11b$_2$, and 11b$_3$, and flux return plates 17a, 17b, and 17c (each made of laminated ferromagnetic material, for example). Each phase A, B, and C of stator 10 is offset by ⅓ of a tooth pitch P assuming three phases such that phase A has a phase shift of zero, phase B has a phase shift of P/3, and phase C has a phase shift of 2P/3.

Figure 8:
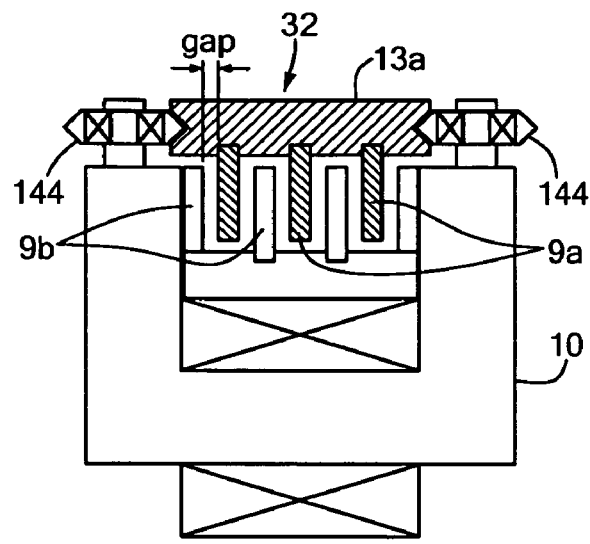
FIG. 8 is a schematic cross-sectional view similar to FIG. 4 with the addition of a linear bearing assembly.

In the embodiment of FIG. 8, the blades of the stator and rotor are fairly thick and the gaps between them fairly large to resist unstable magnetic attractive pressure and to avoid sliding contact between adjacent blades. Thus, shuttle 32 blade teeth 9a and stator 10 teeth 9b can be made relatively thick and relatively large gaps existing between the blades (e.g., 10 mils or greater) but in any case large enough so the blades do touch each other in the presence of unstable magnetic attraction. Linear bearing assembly 144 controls movement of moving shuttle blade carrier 13a.

Figure 9:
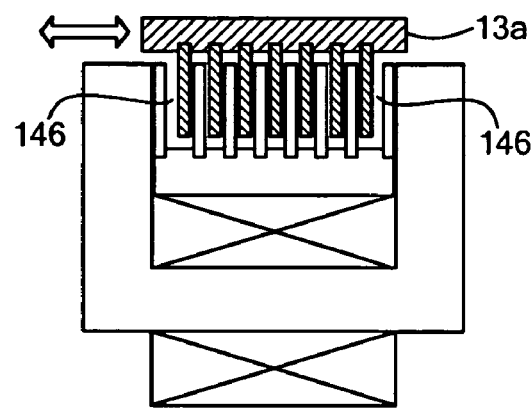
FIG. 9 is a schematic cross-sectional view showing how the size of the gap between the outermost blades and the next adjacent blades can be increased.
Figure 10:
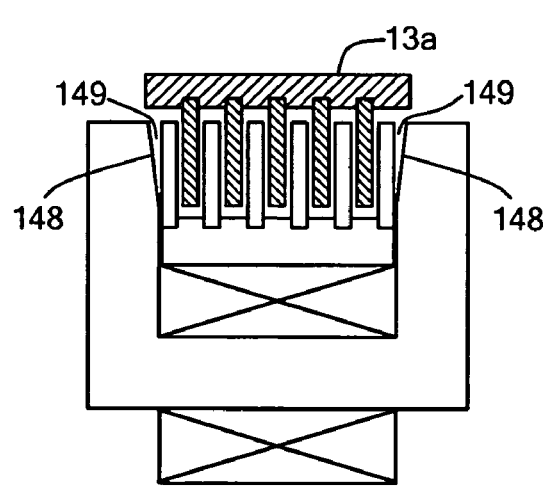
FIG. 10 is a schematic cross-sectional view similar to FIG. 9 except that the flux return side walls of the stator are tapered to increase the gap spacing.

Alternatively, FIG. 9 shows a design where the blades are spaced closely together for maximum force density and minimum power requirements. In this case, the blades may come into contact with each other, but in a practical assembly it is desirable to provide additional lateral play to allow for alignment errors between phases or between the phases and a linear bearing. The larger outer gap 146 between the outermost teeth and the next adjacent teeth allows lateral motion of blade carrier 13a in the case where the remainder of the interleaved teeth of the stator and the shuttle are closely spaced. The blades are stiff in shear but flexible in bending. FIG. 10 show a similar situation in which the flux return portion includes an outwardly tapered wall 148 to increase the gap 149 between the outermost blades of the stator and the flux return section of the stator. In either case, lateral play between the shuttle and the stator is effected by making the outer gap greater than the average gap between the interleaved blades as shown.

Figure 11:
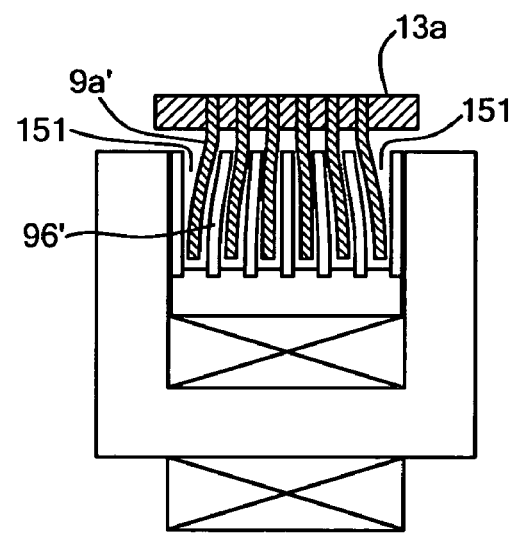
FIG. 11 is a schematic cross-sectional view showing the use of flexible or bent blades for both the stator and the shuttle.

So far, the blades of the stator and the shuttle have been shown to be straight but that is not a necessary limitation of the subject invention as shown in FIG. 11 where both the stator 9b' and shuttle 9a' blades are bent or have an extended root portion or otherwise bend or flex to provide a close blade spacing (e.g., 0.0005" to 0.003") while allowing significant lateral (e.g., ±0.005" to 0.010") motion of the shuffle. Thus, in FIG. 11, outer gap 151 is larger than the average gap between the interleaved blades. Or, the root 29, FIG. 13 of the shuttle blades can include flexural features to allow bending or flexing of the blades when the interleaved blades are very closely spaced. This method provides lateral play without increasing the gaps between blades. In one example, as shown in FIG. 13, the root 29 of the shuttle blade is thinned down. In the embodiment shown in FIG. 14, the root 29 of the teeth are formed with slots 150 to provide flexure and in FIG. 15 different kind of slots 152 are shown. The result is a blade relatively stiff in the axial direction but compliant in the lateral direction.

When the gaps between the interleaved blades are small or non-existent, lubrication can be used to lower the friction between the blades. Or, friction and wear can be minimized by using low-friction materials, coatings, or films. These methods are recommended when the blades are too thin and too closely spaced to maintain a gap in the presence of lateral pressure resulting from unstable magnetic attraction.

In all these embodiments, the blade-carriers of the passive shuttle can move laterally with respect to the corresponding blade-carrier on the active stator by a distance substantially greater than the average gap between interleaved blades without causing high contact stress on the outer blades, thus avoiding friction and wear resulting from lateral misalignment of blade-sets.

Figure 16:
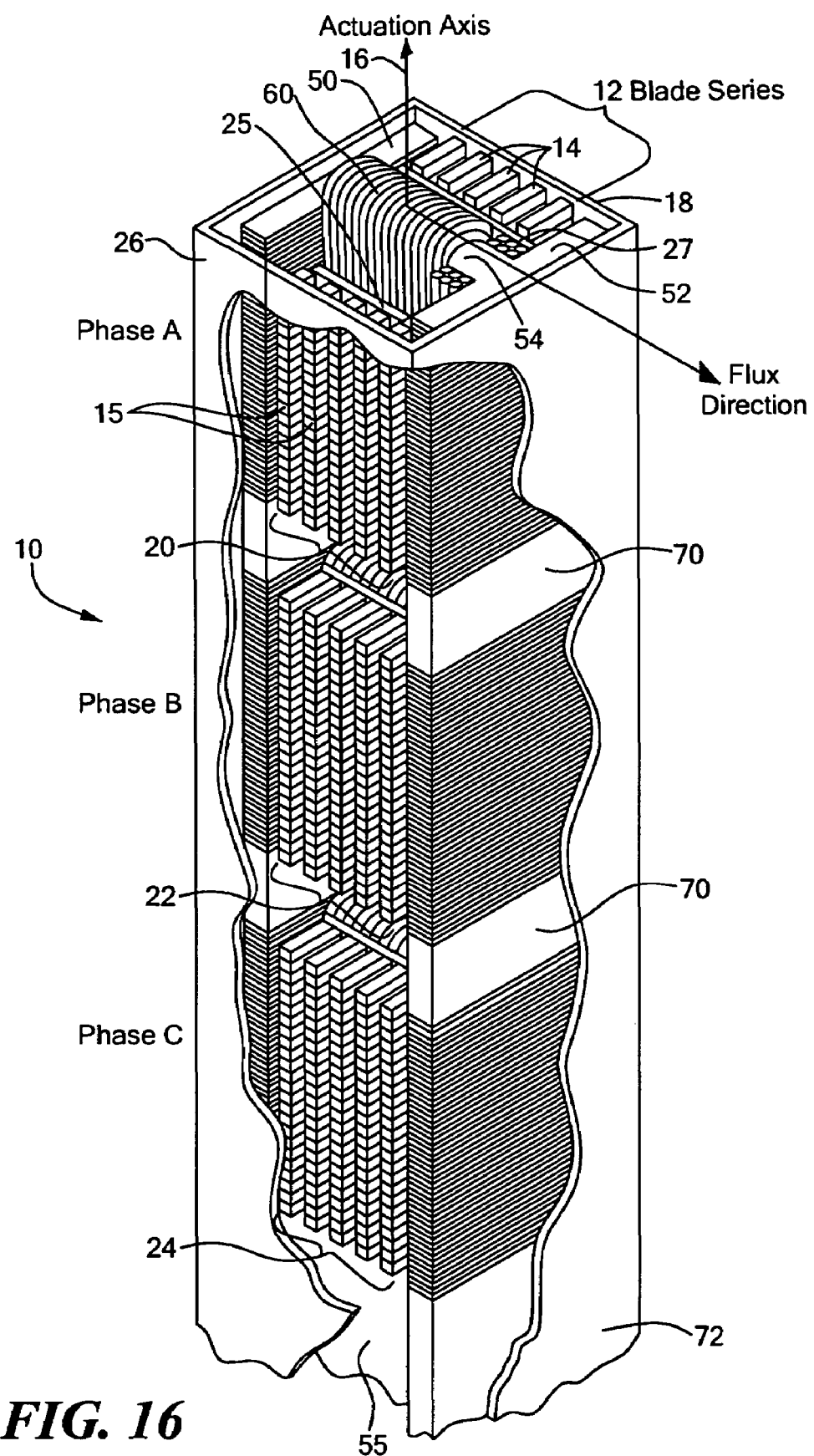
FIG. 16 is a three-dimensional schematic view of one embodiment of the stator portion of a linear reluctance motor in accordance with the subject invention.

FIG. 16 shows another possible configuration of a linear reluctance motor in accordance with the subject invention employing the principles discussed above. In this embodiment, the channel defined by stator 10 is fully enclosed by the walls of the stator as shown and shuttle 32 is telescopingly received in stator 10. Stator 10 includes at least one set 12 of spaced blades 14 each extending lengthwise in the direction of actuation axis 16. In this particular embodiment, there are three serially arranged sets of blades extending outwardly from plate 27 towards side 18 of stator 10 and three opposing serially arranged sets 20, 22, and 24 of blades extending from plate 25 towards side 26 of stator 10 constituting three phases A, B, and C although such a construction is not a limitation of this invention. As shown, blade set 20 includes blades 15. Each blade includes a plurality of alternating low permeability teeth 28 and high permeability teeth 30 where P is the tooth pitch. Assuming the stator has N phases, it is preferred that the blades of each phase of stator 10, FIG. 16 are offset by 1/N of a tooth pitch.

Figure 17:
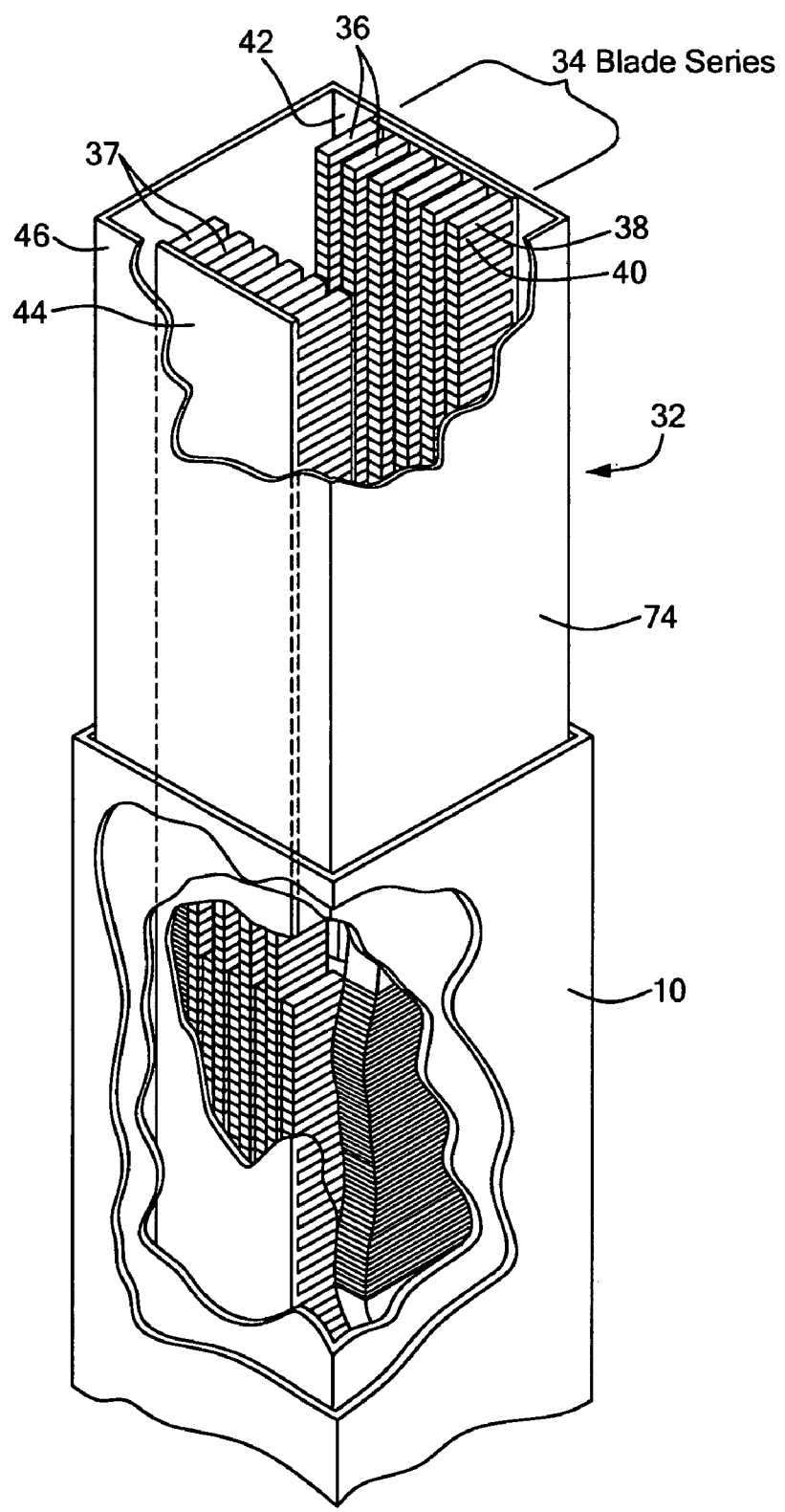
FIG. 17 is a schematic three-dimensional view showing the addition of a shuttle to the stator portion shown in FIG. 16.

Shuttle 32, FIG. 17 also includes a set 34 of spaced blades 36 each also extending lengthwise in the direction of the actuation axis 16 and interleaved with the blades 14, FIG. 16 of stator 10. Each blade 36, FIG. 17 of shuttle 32 also includes a plurality of alternating high permeability teeth 38 and low permeability teeth 40. As shown in this particular embodiment, blade set 34 extends inwardly from wall 42 of shuttle 32 interleaved with blades 14, FIG. 8 of stator 10. An opposing blade set 44, FIG. 17 of shuttle 32 has blades 37 extending inwardly from wall 46 of shuttle 32 interleaved with blades 15 of blade sets 20, 22, and 24, FIG. 16 of stator 10.

In accordance with this invention, the active component or the subsystem which drives the shuttle is associated with either the stator, the shuttle, or both. In embodiment of FIGS. 16–18, the active component is divided into three serially arranged phases A, B, and C as already discussed and is associated with stator 10, FIG. 16. Thus, phase A includes blade sets 12 and 20 and iron flux return plates 50 and 52 interconnected by core 54 forming an I-shaped flux-return structure. Phase A also includes coil 60 wound about core 54 between blade carrier plates 25 and 27 to produce flux through the sets of interleaved blades of the shuttle and the stator in a direction 62 substantially transverse to the direction 16 of the actuation axis. Flux return plates 50 and 52 are thus each adjacent an end of coil 60.

Phases B and C are constructed in a similar fashion each having their own coil, flux return plates, and blades except that, as noted above, the blades of phase B of stator 10 are offset ⅓ of a tooth pitch from the blades of phase A and the blades of phase C are offset by ⅓ of a tooth pitch from the blades of phase B. Structural spacers 70 support phases A and B to phase C, and phase C is supported by the structural I-beam column 55. At the base of this column, the structural housing 72 and the column 55 are attached. These components complete the primary components of stator 10 resulting in shuttle FIGS. 17 and 32 telescopmgly received in stator 10.

FIGS. 19–22 show an example where the motor is cylindrical in shape but otherwise the same reference numerals are used to denote structures similar to the structures of FIGS. 16–18. As shown in FIG. 19, sliding bearings 100 and 104 allow shuttle 32 to telescopingly move up and down along actuation axis 16 within stator 10. Limit stop 102 prevents further travel of shuttle 32 and flange 106 supports the active stator section 10. I-beam stator support column 55 is secured in base 108. FIG. 19 also shows the retracted height of shuttle 32, the active stator section, and the stroke of shuttle 32.

Figure 20:
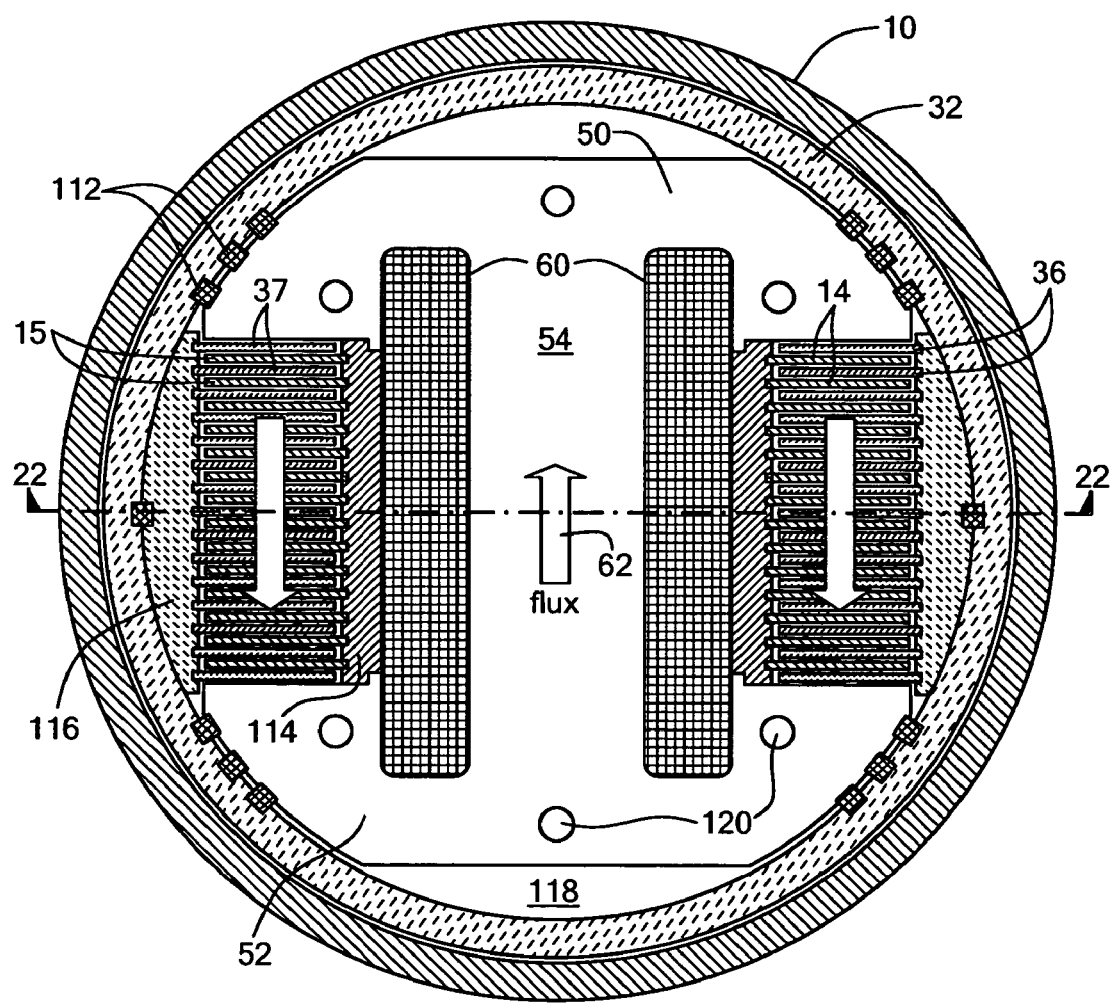
FIG. 20 is a sectional view taken along line 20—20 of FIG. 19.
Figure 21:
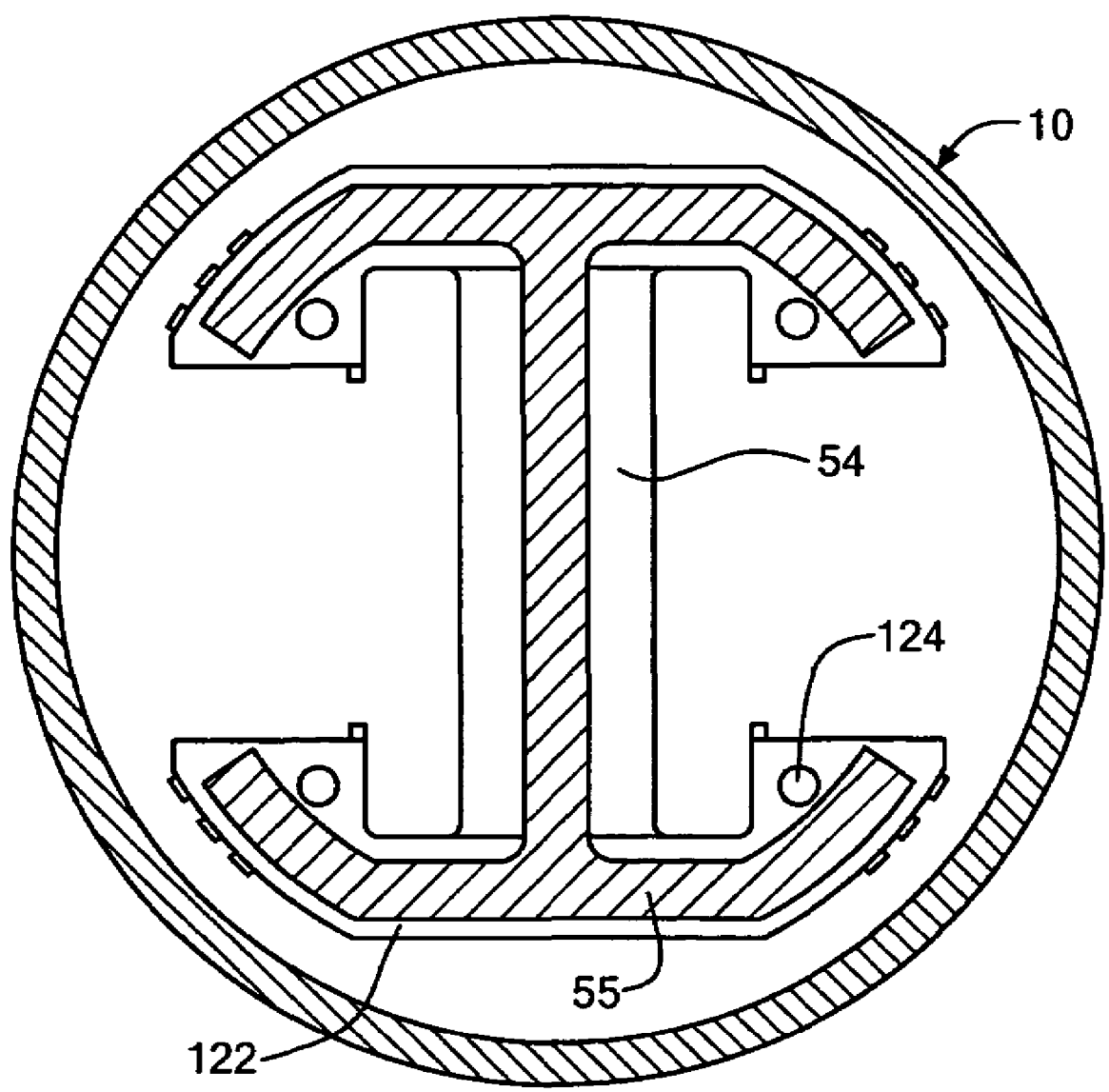
FIG. 21 is a sectional view taken along line 21—21 of FIG. 19.
Figure 22:
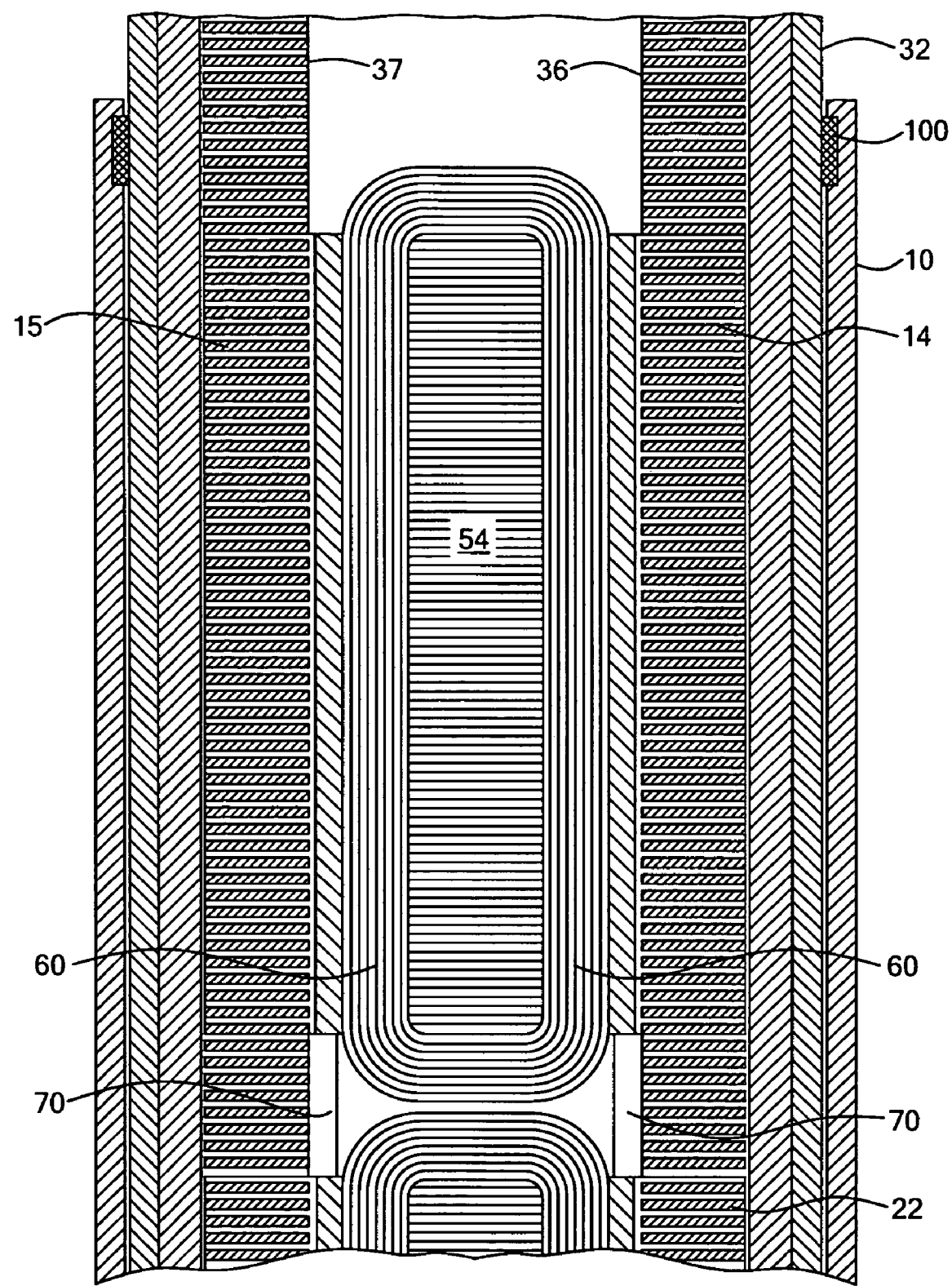
FIG. 22 is a cut away sectional side view taken along line 22—22 of FIG. 20.

FIG. 20 shows anti-rotation bearings 112, stator blade carrier 114, shuttle blade carrier 116, and open channel 118 which allows for fluid passage. Tie rods 120 hold the core together. FIG. 21 shows additional details of I-beam stator support column 55 including stator support flange 122 and threaded hole 124 for tie-rod 120, FIG. 20. FIG. 22 is a cut-away side view showing one complete phase A and a portion of phase B but otherwise the same numbering convention is used.

With respect to the embodiment shown so far, the blades of the shuttle run the full length of the shuttle tube and the blades of the stator are interleaved with those of the shuttle but over a relatively short section. The blades of the shuttle have a constant pitch the whole length of the shuttle but in the stator the three sets of blades are offset by ⅓ of a tooth pitch relative to each other. When one of the three phases is energized, flux is generated which goes through the stack and tends to bring the shuttle and the stator blades of that phase into alignment. On the stator side, the resulting force is transmitted through the stator blade carrier to the laminated core. The core is held together with the tie rods shown in FIG. 20 and/or an adhesive and is attached to structural I-beam 55, FIG. 21 which reacts the force back to the base 108, FIG. 19 of the stator. On the shuttle side, shuttle blade carrier 116 is used to connect the shuttle blades to shuttle tube 32. Typically, both blade carriers and the shuttle 32 and stator 10 tubes are made of non-magnetic material such as 300 series stainless steel, brass, aluminum, ceramic, or reinforced polymer material. To avoid an eddy-current loop, the stator blade carrier should be insulated with respect to the core laminations. The stator blade carrier 114 should also be stiffly and strongly affixed to the core. The preferred method is to bond stator blade carrier 114 to the core. For structural strength and stiffness, the gaps between the teeth may be potted with a non-conductive, non-magnetic filler material such as a ceramic-filled epoxy. The blades can also be laminated on each side with a thin layer of structural material.

One advantage of this geometry is that the wires leading to the three phases do not need to move. This avoids the need for sliding contacts (commutation) or extensible wires. Another advantage is that the relatively delicate blades are protected from damage.

Alternative geometries, however, are possible and within the scope of the subject invention. For example, the windings could be located on the shuttle, on the stator, or both. More than three phases could be used. The phases could be arranged axially as shown, side-by-side, or a combination of the two. The core could be "C" shaped and flux directed through only one blade-stack as opposed to two with the I-beam shaped core shown. The blades of the shuttle could be short compared to the stator, or the other way around. Or, the blades of the shuttle and the stator could be similar thus providing highest force in the retracted position and force decaying as the shuttle extends. Mechanically, the connection to the shuttle could be achieved using cables, pushrods, or a direct connection to a moving carriage. If the phase windings reside on the shuttle, power could be supplied locally by sliding contacts, or by an extensible conductor, for example, a coiled wire.

In the case of a long active stator and a relatively shorter shuttle, it may be desirable to arrange the phases axially in a repeating pattern (i.e., ABCABCABC . . . ). In a three-phase design, the shuttle should be at least four (number of phases plus one) long, so that it always overlaps at least three phases. Compared to a long-stator/active-short-shuttle machine, this one may require more copper and electrical steel, but avoids the problem of commutation.

In any design, the shear pressure generated on the surface of each shuttle blade is dependent on the relative alignment of the blade "teeth", the flux-density, the tooth geometry, and the magnetic characteristics of the blade steel.

Figure 23:
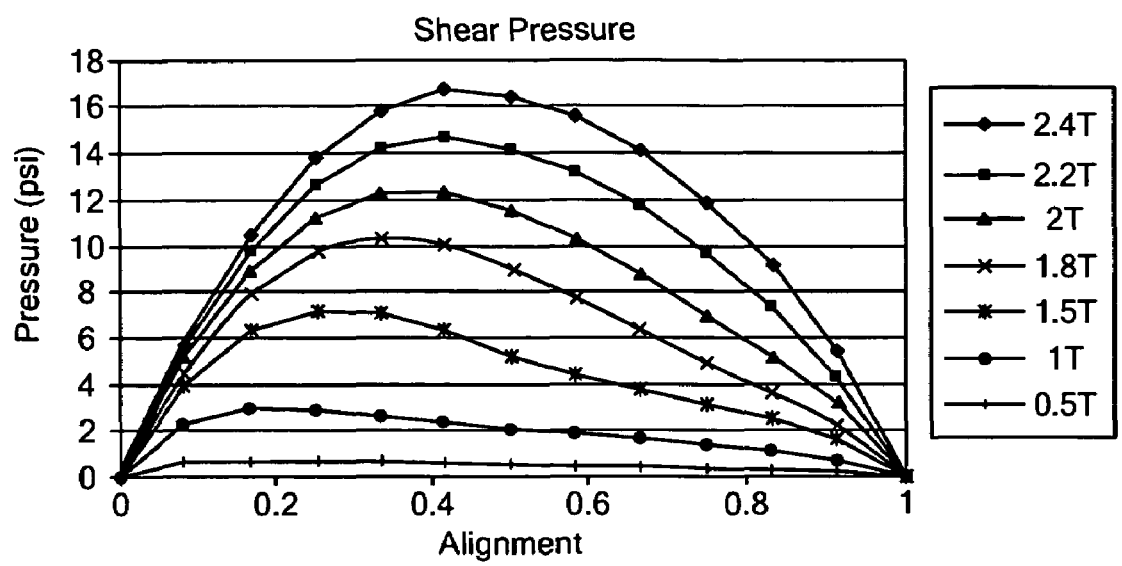
FIG. 23 is a graph showing the relationship between shear pressure and tooth alignment at various flux densities for a typical reluctance motor in accordance with the subject invention.

Assuming the use of M19 silicon/iron alloy, a blade thickness of 0.015", a tooth pitch of 0.036", a tooth width of 0.018", and an average air gap of 0.001", a finite element magnetic analysis predicts a shear pressure as a function of tooth alignment and flux density as shown in FIG. 23. The flux density shown in the legend in this case represent the equivalent flux density if all the flux were to go through the blade teeth. In other words, the average flux density through the stack is half the values given in the legend (in units Tesla). While this data is based on the tooth width being half of the tooth pitch, other ratios of width/pitch are also acceptable. Use of width/pitch ratio of 0.55 may be beneficial to increase blade stiffness and strength and to reduce wear. Use of a width/pitch ratio slightly less than 0.5 provides similar shear pressure but requires less flux, thus reducing the size of the flux-return for a given force rating.

Figure 24:
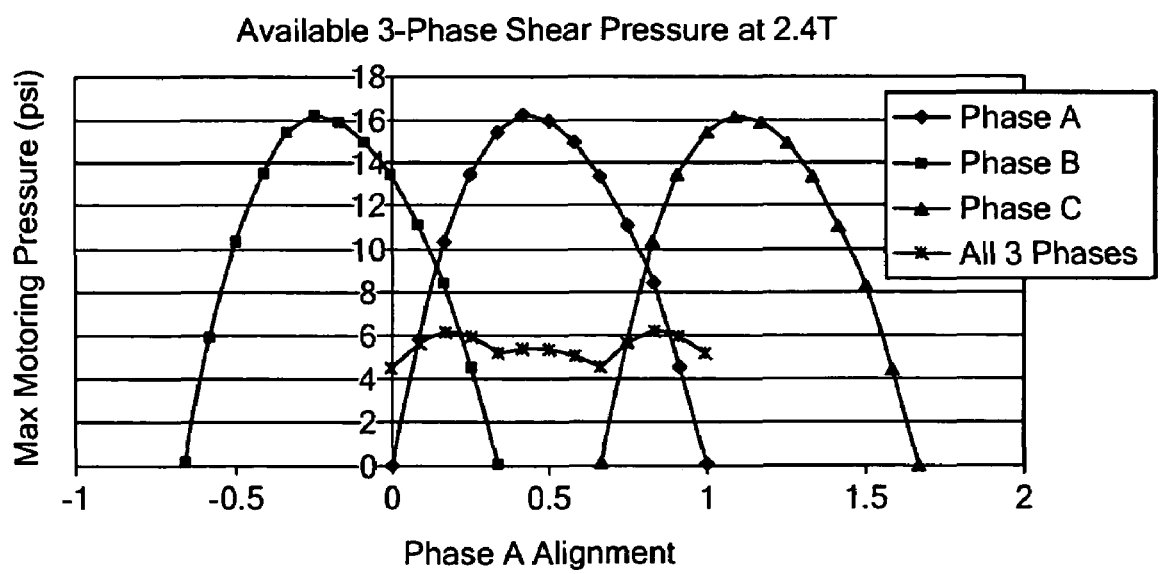
FIG. 24 is a graph showing the available three-phase shear pressure.

Each phase produces positive force over a fraction of the tooth alignment cycle. This is why a minimum of three phases is preferential in order to apply smooth force in either direction. While the curve of FIG. 23 peaks at almost 17 psi, the average pressure is only about 10 psi over the useful part of the range. But since the phase is off half the time, the average shear pressure for continuous movement is about 5 psi. Actually, the number of phases also comes into play as illustrated in FIG. 24. The lowest available shear pressure occurs when one phase is ⅔ aligned and the next phase is misaligned.

Figure 25:
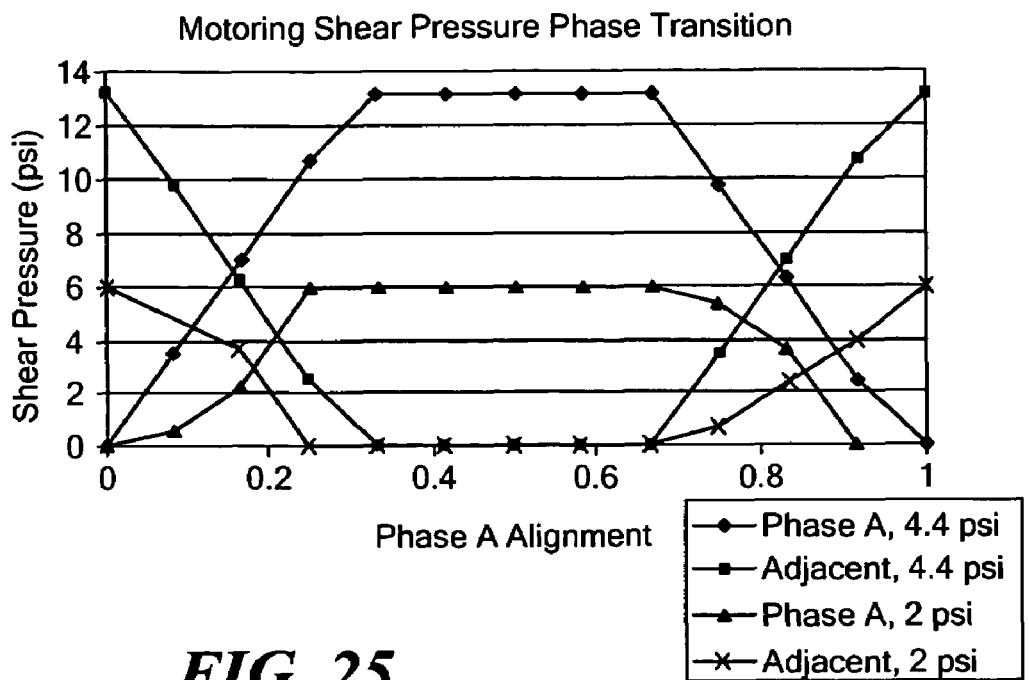
FIG. 25 is a graph showing the three-phase shear pressure transition for minimum resistive dissipation.
Figure 26:
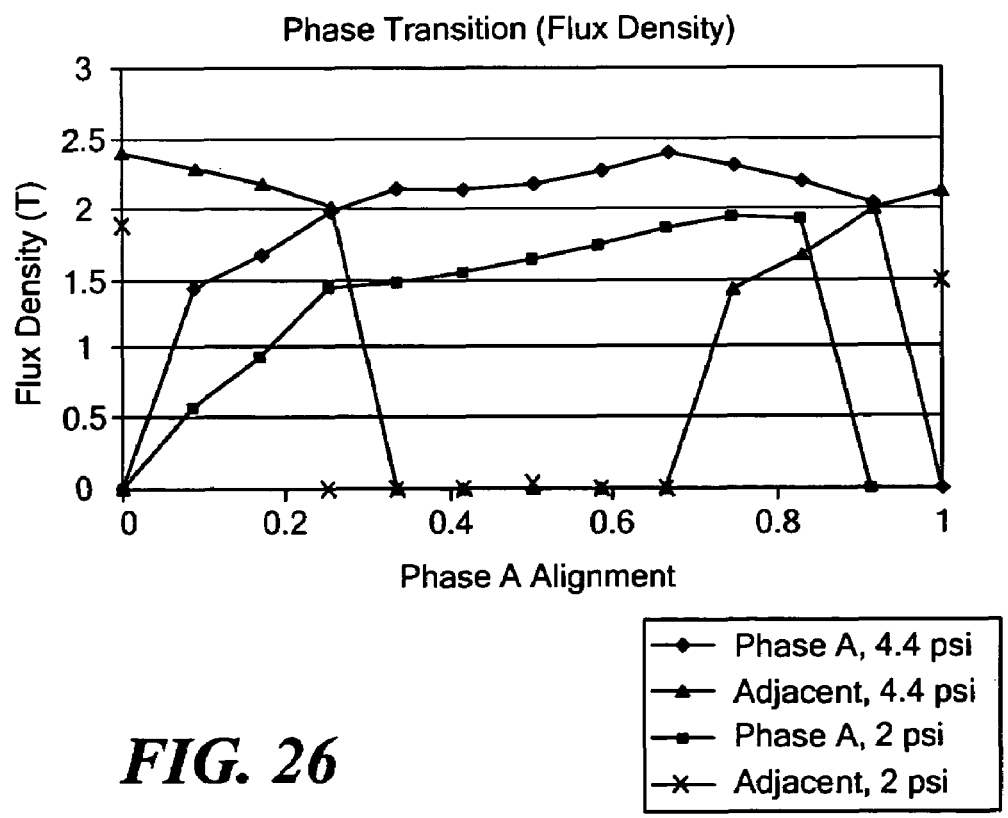
FIG. 26 is a graph showing the three-phase flux-density transition for minimum resistive dissipation.
Figure 27:
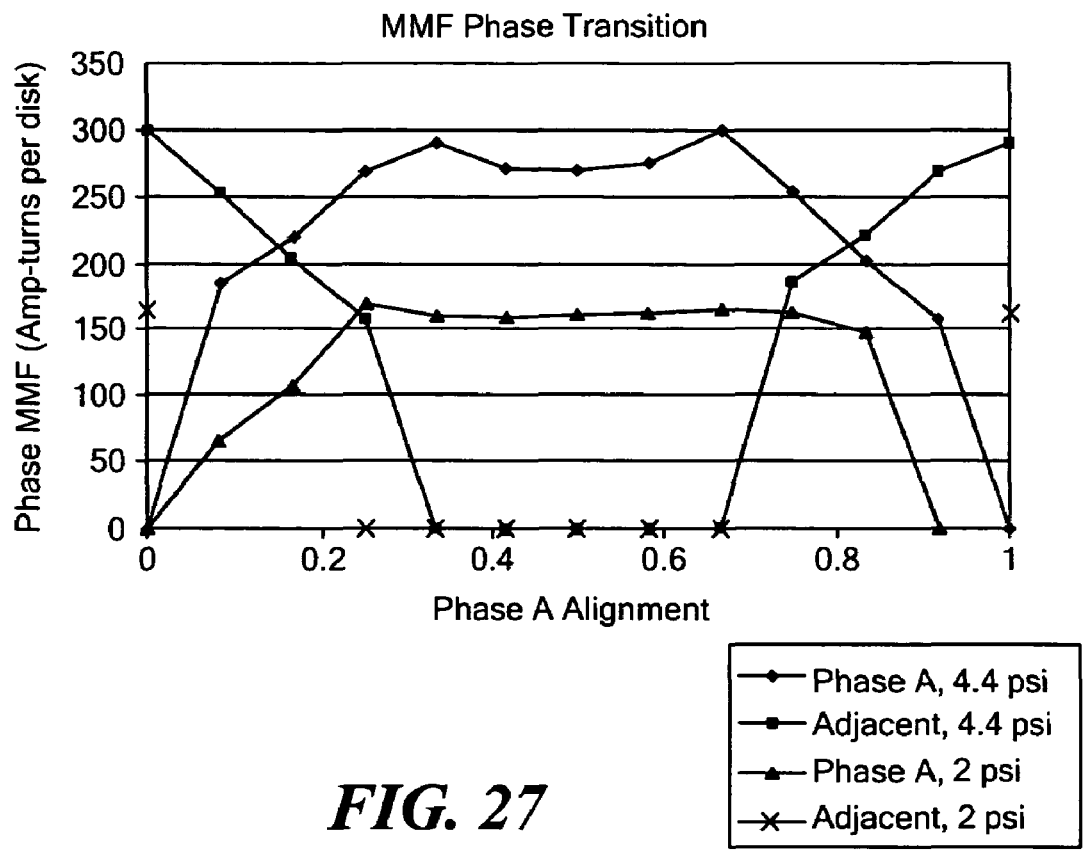
FIG. 27 is a graph showing the three-phase MMF transition for minimum resistive dissipation.

To produce a constant force, the current to each of the three phases should be modulated as a function of commanded force and shuttle position. FIGS. 25–27 show the preferred way to transition from one phase (phase A) to an adjacent phase (B or C), assuming a three-phase machine with the same tooth geometry as in the previous figures. Two sets of transition curves are shown, assuming a commanded shear pressure of 2 and 4.4 psi. The transition curves assume quasi-static operation and are optimized for minimum resistive losses.

From analytical and finite element magnetic analysis above of other tooth geometries (i.e., thickness, width, and pitch) and other electrical steel alloys, it appears that the maximum shear pressure scales with the square of the saturation flux density of the blade material and that to a first-order, the stall-force resistive power loss scales as follows:

$$\text{Power} \propto N^2 \cdot t^0 \cdot p^1 \cdot g^{1.6} \tag{1}$$

where N is the number of disks per stack, t is the disk thickness, p is the tooth pitch, and g is air-gap.

As shown in FIG. 20 in particular, interleaved shuttle blades 37 and stator blades 15 have almost no gap therebetween and during actuation the blades will touch and rub against each other. Since the rate of travel of shuttle 32 is relatively slow, however, wear is not a primary concern. Instead, by making the blades relatively thin, the blade density can be increased resulting in a large force density. The conventional wisdom is that each blade must be sufficiently thick and stiff to support itself and/or that the gaps between the blades must be large. The truth is that in a relatively slow moving motor the blades can actually touch and rub against each other. And, the added benefit of reducing the extent of the gaps between the blades is reduce losses and less coil is current is required to generate the necessary flux. Thus, in one example of the subject invention, the blades are relatively thin 0.020" (e.g., 0.020") and the gaps between adjacent blades extremely small 0.002" (e.g., 0.002") or smaller such that the blade density is substantially increased resulting in a larger or force density and reduced losses and coil current required to generate the necessary flux. Use of very small air gaps also reduces the lateral magnetic pressure tending to attract the faces of the blades together. If a blade is exactly centered between adjacent blades, the attractive forces cancel. Due to magnetic instability, however, a blade will be drawn to one side or the other, but, by minimizing the air gap the net lateral force is minimized, thus reducing friction and wear.

Figure 28:
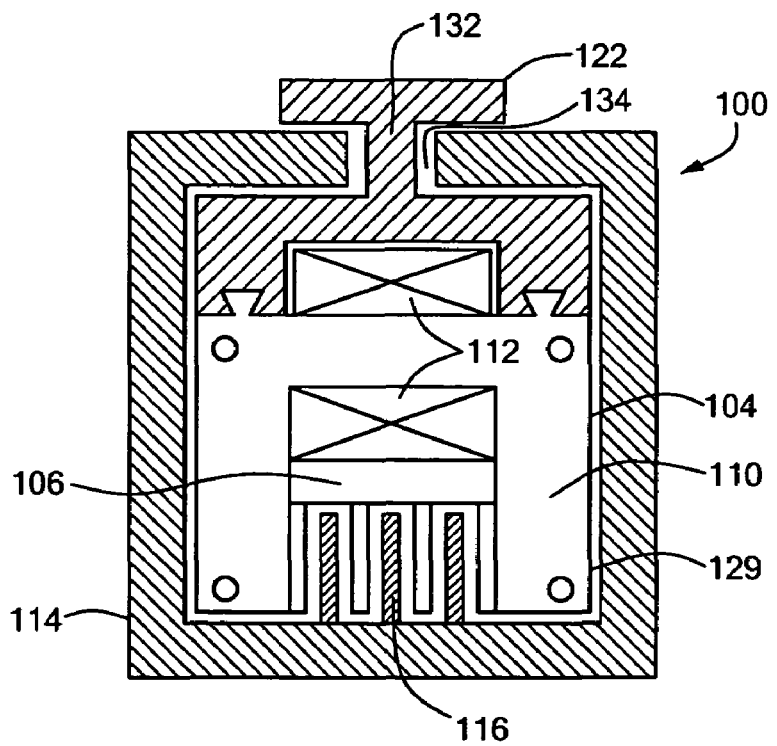
FIG. 28 is a schematic cross-sectional view showing another linear reluctance motor in accordance with the subject invention wherein the shuttle includes the active component and has three phases arranged in series along the actuation axis.
Figure 29:
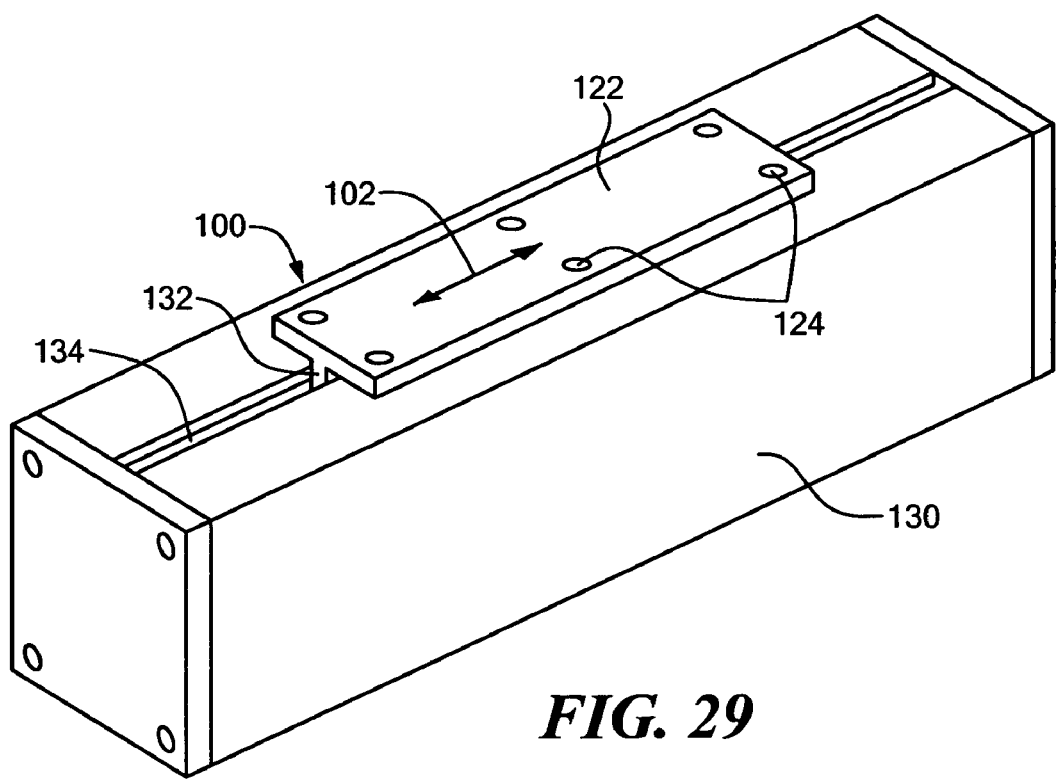
FIG. 29 is a schematic three-dimensional view of the linear reluctance motor shown in FIG. 28.
Figure 30:
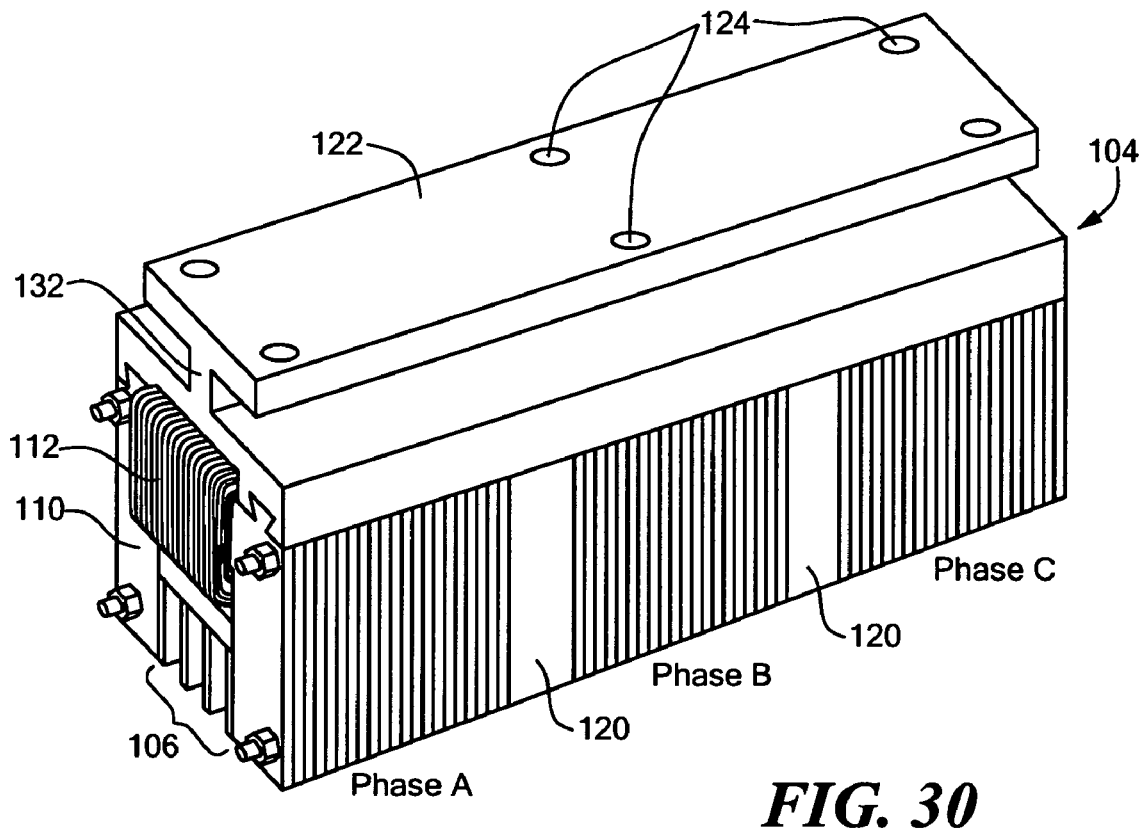
FIG. 30 is a schematic three-dimensional view showing the shuttle portion of the linear reluctance motor depicted in FIG. 28.

FIGS. 28–30 show another linear reluctance motor 100 in accordance with this invention having an actuation axis 102. Here, shuttle 104 includes three serially aligned phases A, B, and C, FIG. 30, and, associated with each phase a blade set 106, a flux return portion 110, and a coil 112 wound to produce flux through the sets of interleaved blades of the stator and shuttle in a direction substantially transverse to the actuation axis. Stator 114, FIG. 28 includes blade set 116 extending into the channel of stator housing 130 and interleaved with the blade set of shuttle 104. Structural spacers 120, FIG. 30 (preferably non-magnetic) separate the phases of shuttle 104. The result is a long passive stator and in comparison a relatively short active shuttle providing a long stroke, low weight, and low power consumption. Whatever is to be driven by shuttle 104 is attached to driving element 122 by mounting features 124. Driving element 122, external to stator housing 130, is connected to flux return portions 110 of shuttle 104 within the C-shaped channel 129 of stator housing 130, FIG. 29 by fin 132 which is received in longitudinal slot 134 of stator housing 130.

Here, the length of the active shuttle is La, the length of the passive stator is Lp, the passive stator is longer than the active shuttle, the available motor force is substantially constant over the stroke length Lp-La, and therefore, this configuration provides for a long stroke, low weight and low power consumption.

Figure 31:
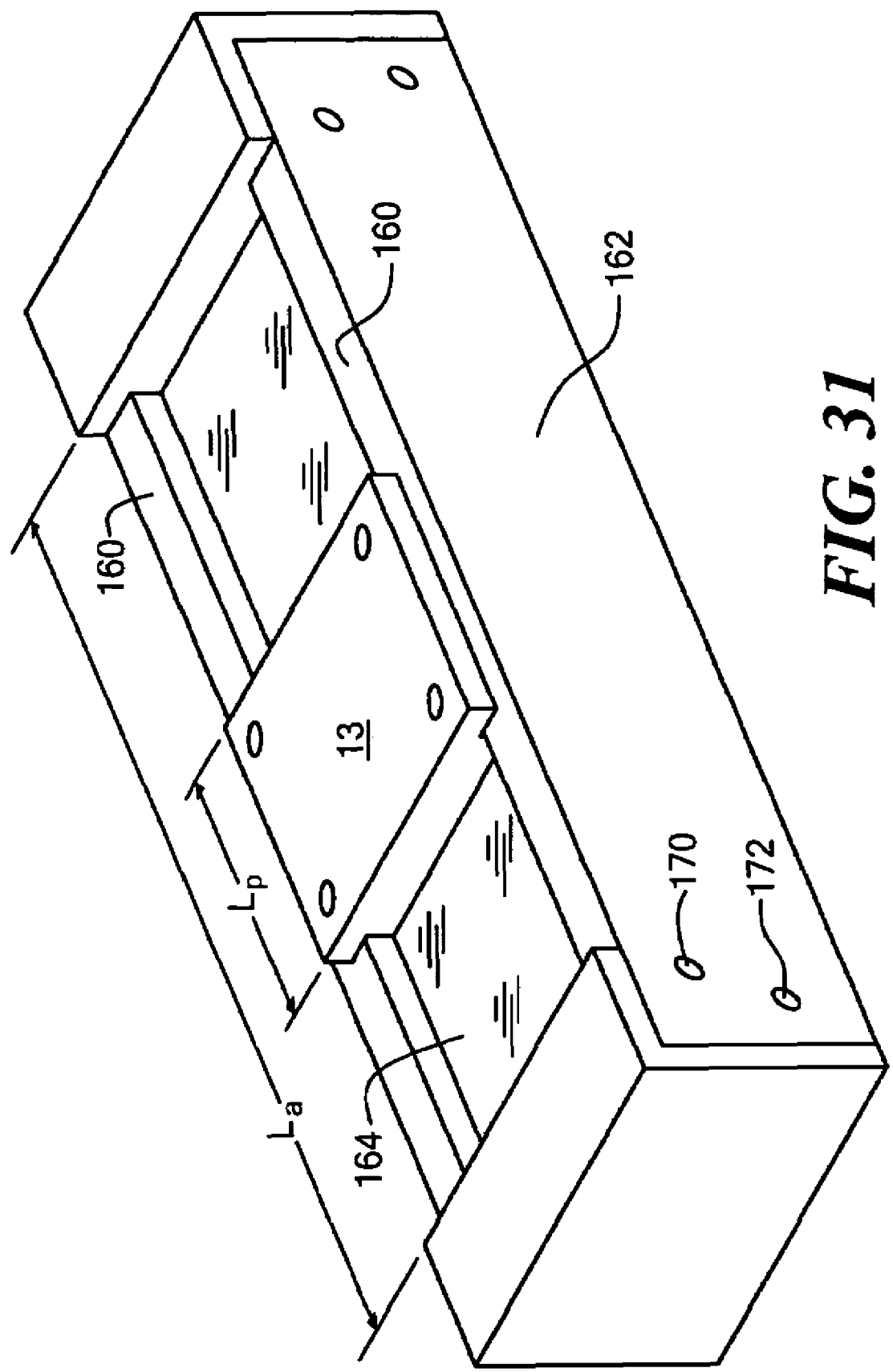
FIG. 31 is a schematic three-dimensional view of another linear reluctance motor in accordance with the subject invention wherein the stator includes the active component and the three phases are arranged laterally.
Figure 32:
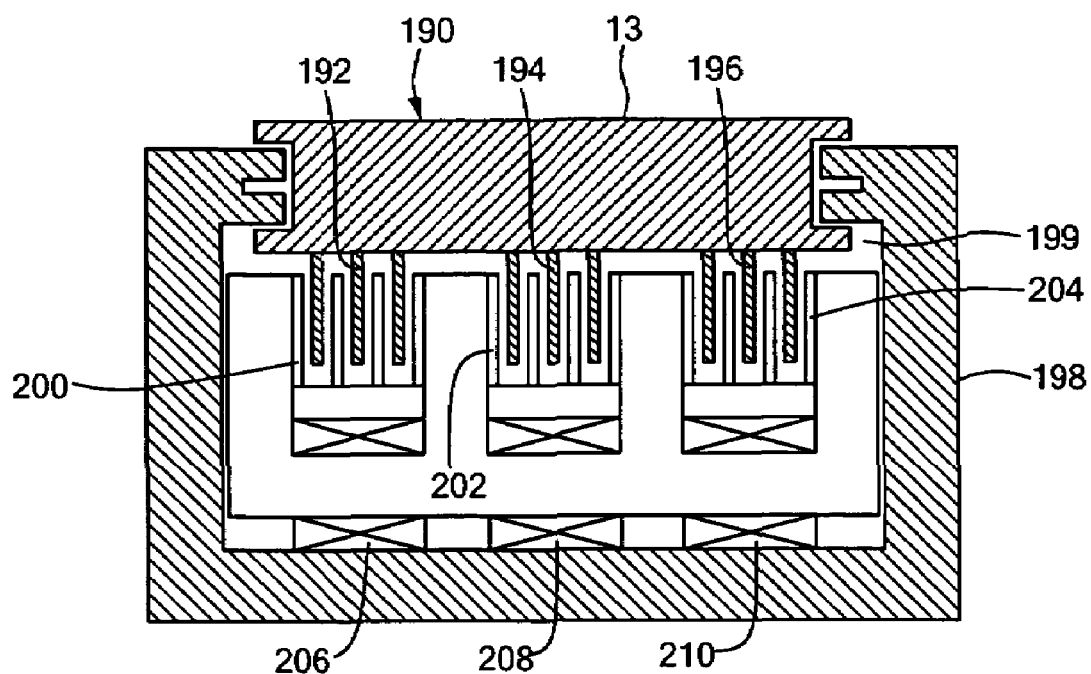
FIG. 32 is a schematic cross-sectional view of the linear reluctance motor shown in FIG. 31.
Figure 33:
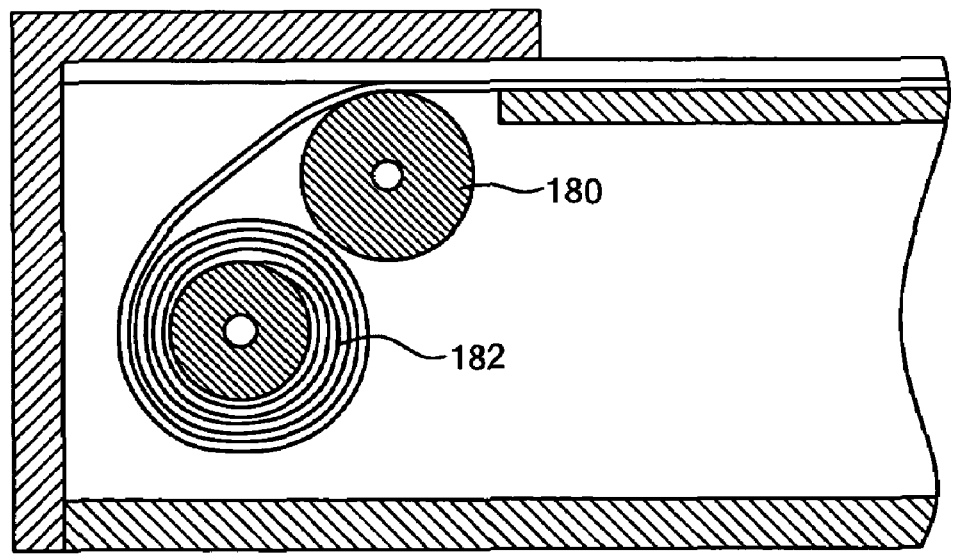
FIG. 33 is a side cross-sectional view of the linear reluctance motor shown in FIG. 31.
Figure 34:
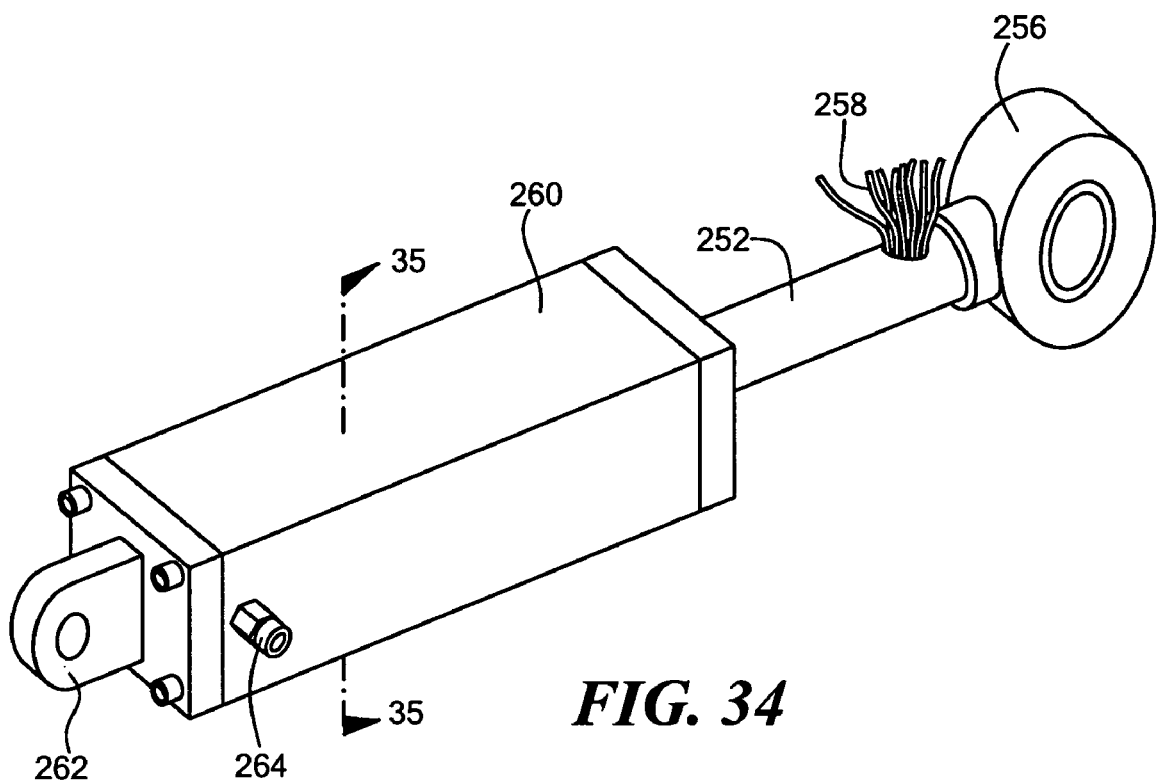
FIG. 34 is a schematic three-dimensional view of another linear reluctance motor in accordance with the subject invention wherein the shuttle includes the active component and the phases thereof are arranged both axially and laterally.
Figure 35:
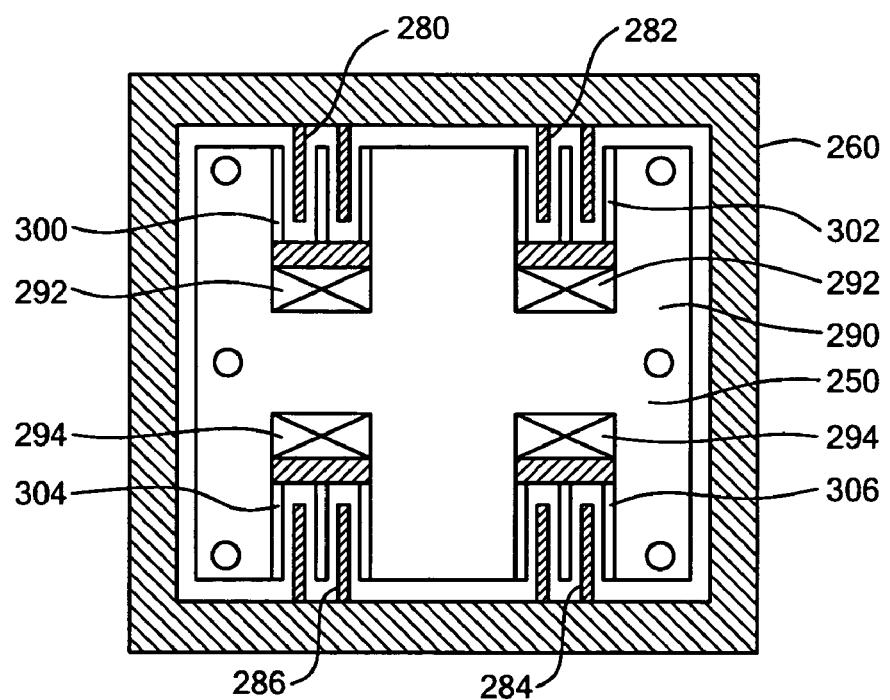
FIG. 35 is a schematic cross-sectional view of the linear reluctance motor shown in FIG. 34.

In FIG. 31, passive shuttle blade carrier 13 slides on rails 160 of active stator housing 162 and is fixed to sliding shutter 164 which moves with shuttle blade carrier 13 to protect the internal components of the stator and shuttle assembly including the coils and the interleaved blades in a working environment. The design of FIG. 31 results in a short passive shuttle and a long active stator. Thus, the shuttle is relatively short and the stator is relatively long, the shuttle is mounted inside a C-shaped channel defined by stator 162, the short shuttle has mounting features accessible from the open side of the channel, and the channel is sealed using two extensible covers, each attached on one end to carrier 13, and the other to an end of the C-shaped channel. Axle 170 is for idler roller 180, FIG. 33 and axle 172, FIG. 31 is for rolled up shutter material as shown at 182, FIG. 33. FIG. 32 shows passive shuttle 190 with three sets 192, 194, and 196 of blades arranged laterally with respect to the actuation axis extending into channel 199 from carrier 13 and active stator 198 with three sets of blades 200, 202, and 204 also arranged laterally and coils 206, 208, and 210 associated with each phase. Thus, stator housing 198 defines channel 199 for receiving shuttle 190 therein and the blade sets 200, 202, and 204 of the stator are adjacent each other across the channel 199. The blade sets 192, 194, and 196 of the shuttle are also adjacent each other and across the channel. In this design, the phases of either the stator or the shuttle or both could be offset to effect a phase shift of P/N between each phase.

Figure 36:
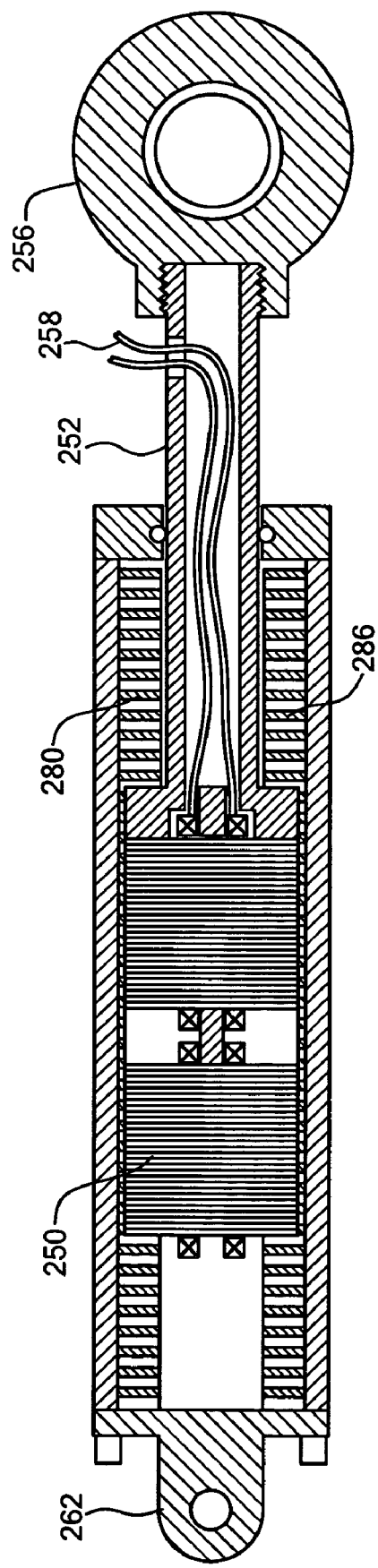
FIG. 36 is a side cross-sectional view of the linear reluctance motor shown in FIG. 34.
Figure 37:
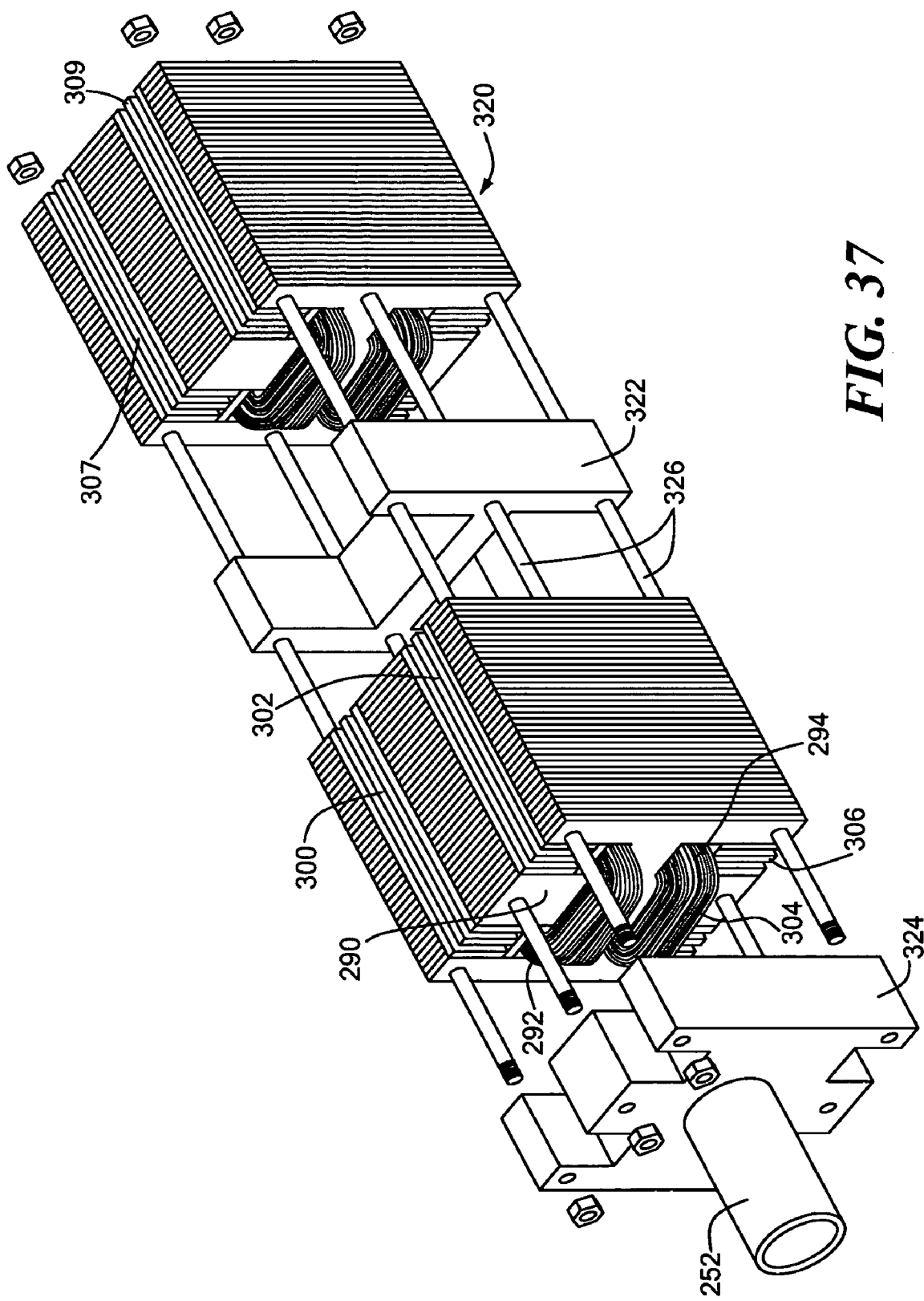
FIG. 37 is a schematic three-dimensional view showing the shuttle of the linear reluctance motor of FIG. 34.

In the construction of FIGS. 34–37, the phases are distributed both axially and laterally. Shuttle 250, FIG. 36 is active and includes push rod 252 terminating in mounting feature 256 and enclosing coil wires 258. Stator 260 includes the housing as shown with mounting feature 262 and vent hole 264 which can be pressurized or depressurized for pressure equalization with a pressure fitting serving as vacuum compensation means or could be attached to a filter to allow venting to the atmosphere but rejecting corrosive fluids, dust, and the like. The blade sets 280, 282 are associated with phase A, and blade sets 284 and 286 are associated with phase B, and thus phases A and B are arranged laterally. Phases C and D are also lateral to each other but are axially disposed with respect to phases A and B. The phases of stator 260 are thus arranged to provide phases distributed both axially and laterally combined with the flux return portion 290 of shuttle 250 and coils 292 and 294 of the shuttle and shuttle teeth sets 300, 302, 304, and 306. A more complete view of the shuttle is shown in FIG. 37 where coil 292 and shuttle blade sets 300 and 302 define phase A, coil 294 and shuttle blade sets 304 and 306 define phase B and a similar arrangement as shown at 320 define phases C and D. Structural non-magnetic spacer element 322 separates the phase A and B coils from the phase C and D coils as shown and in combination with push rod spacer 324 and tie rods 326 form the structure of the active shuttle. Stator 260 thus includes one pair of adjacent blade sets 280 and 282 opposing another pair of adjacent blade sets 286 and 284. Shuttle 250, in turn, includes first pair of adjacent blade sets 300 and 302 opposing a second pair of adjacent blade sets 304 and 306 defining phases A and B and, as shown at 320, a third pair of adjacent blade sets 307 and 309 opposing a fourth pair of adjacent blade sets defining phases C and D.

Figure 38:
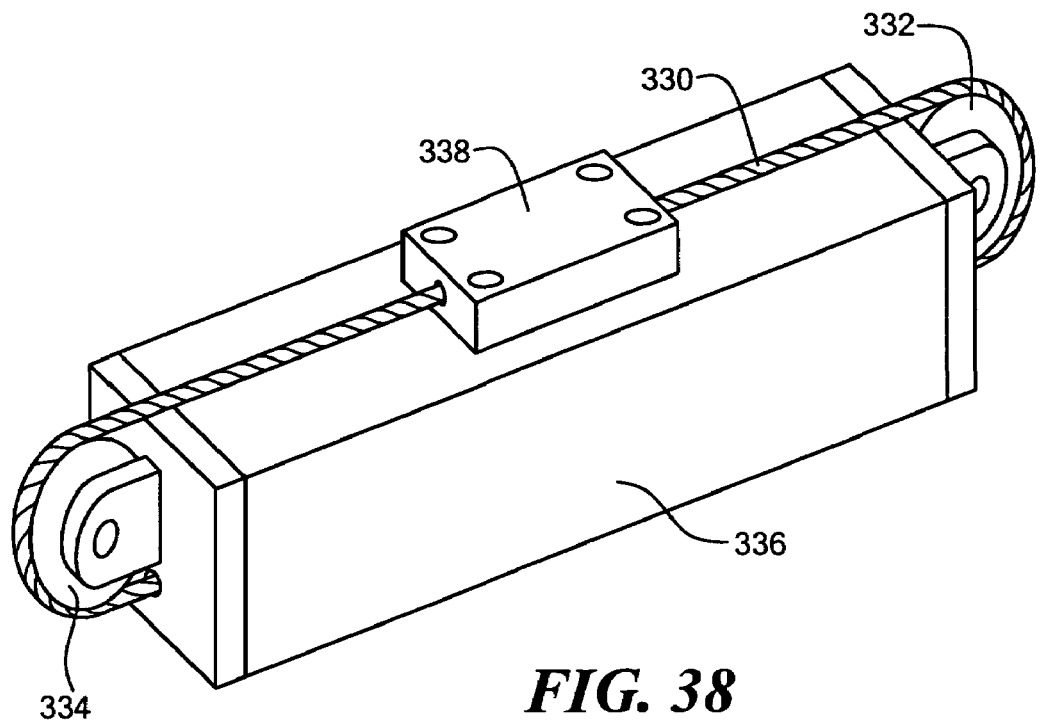
FIG. 38 is a schematic three-dimensional view showing another embodiment of a linear reluctance motor in accordance with the subject invention.
Figure 39:
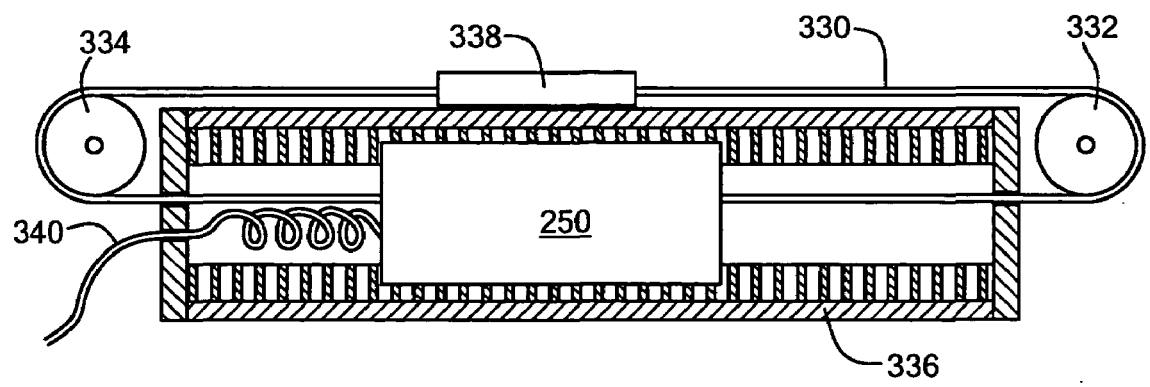
FIG. 39 is a side schematic cross sectional view of the linear reluctance motor shown in FIG. 38.

FIG. 38 shows how a tension element such as cable 330 and pulleys 332 and 334 can be arranged on stator housing 336 and connected to cable terminator 338 which is the component to which a linearly driven subsystem is connected to in another embodiment where the shuttle 250, FIG. 39 is active as described above. In this embodiment flex cable 340 would be connected to active shuttle 250 in order to power the coils thereof. Helical wires, lazy tong linkages, or axial conductive bars and sliding contacts could also be used.

Figure 40:
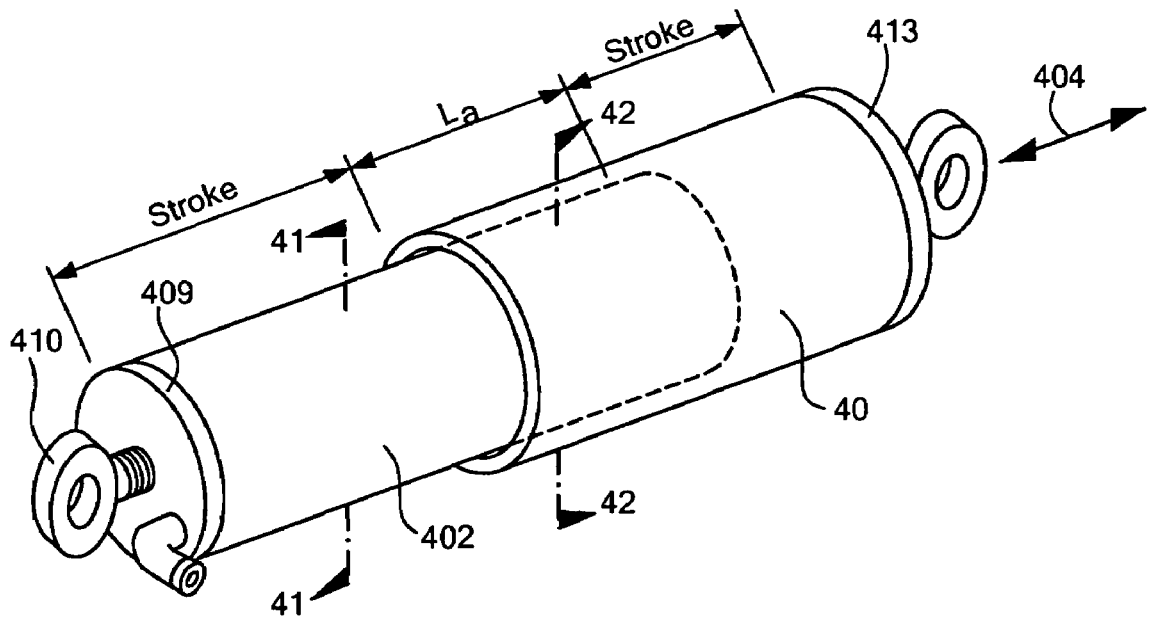
FIG. 40 is a schematic three-dimensional view of still another linear reluctance motor in accordance with the subject invention.
Figure 42:
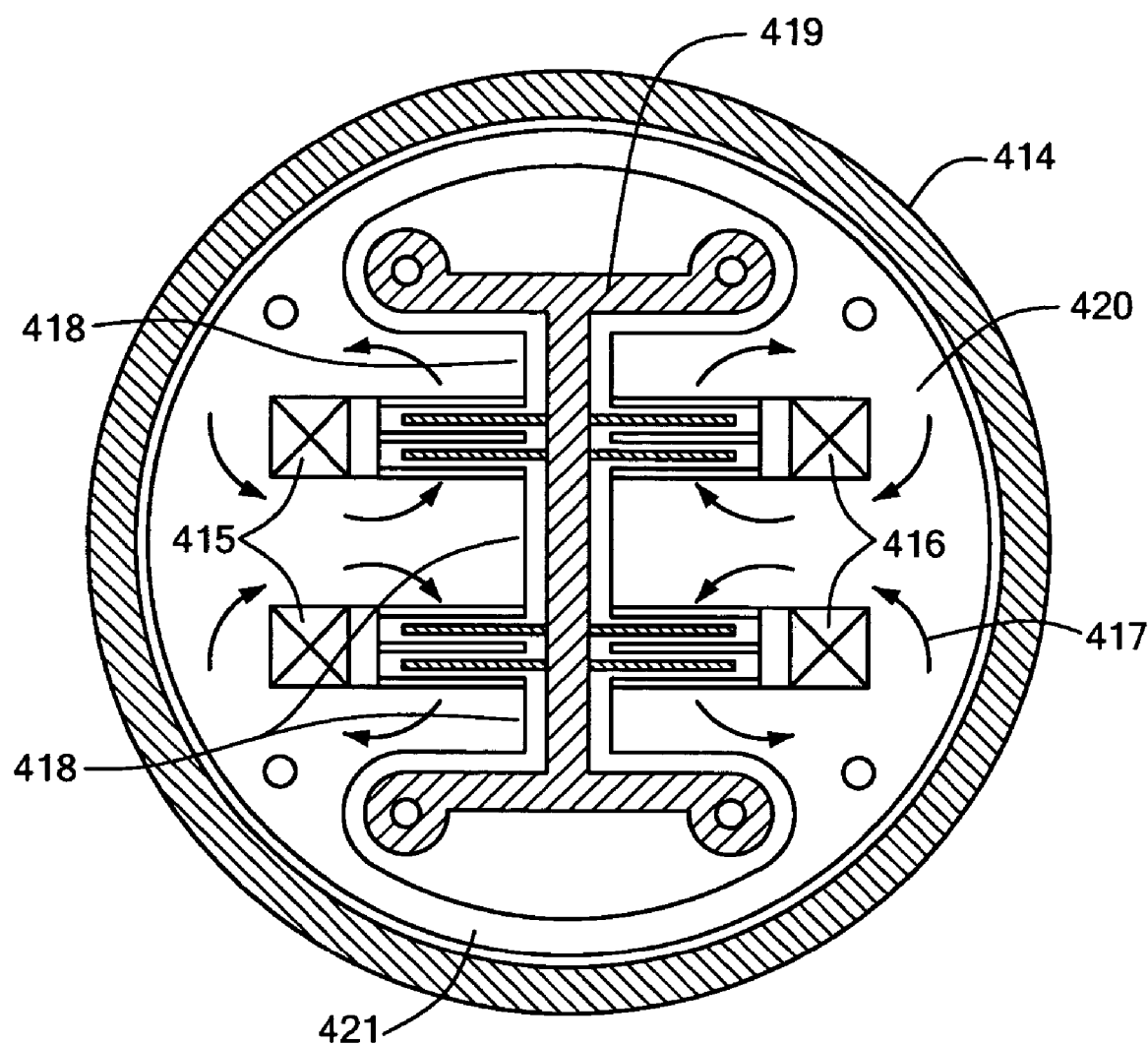
FIG. 42 is a schematic cross-sectional view of the stator portion of the linear reluctance motor shown in FIG. 40.
Figure 43:
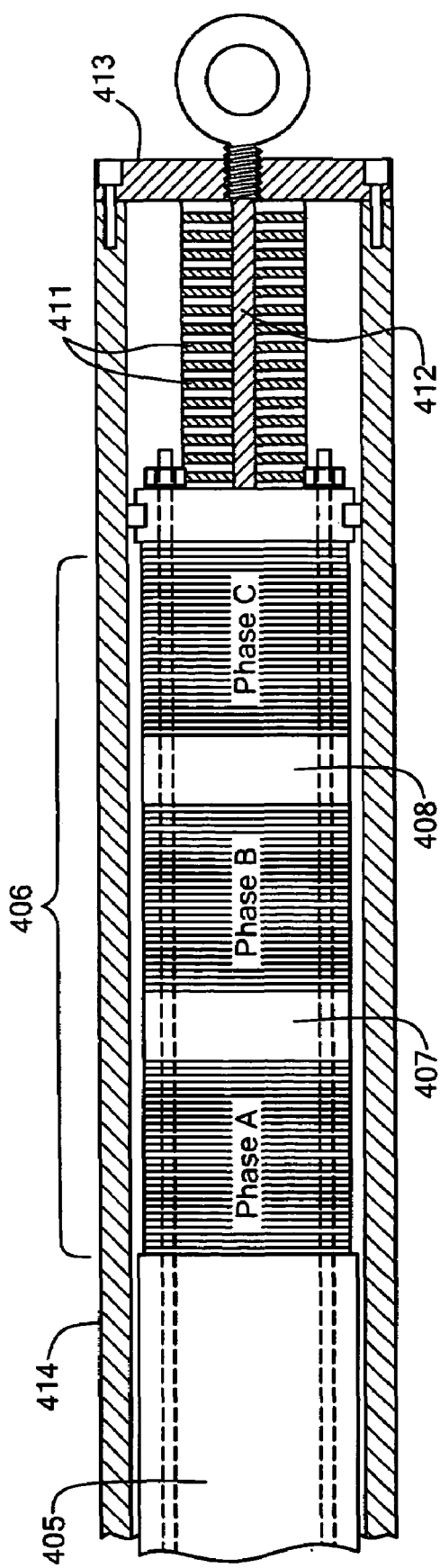
FIG. 43 is a schematic cut-away view of the linear reluctance motor shown in FIG. 40.
Figure 44:
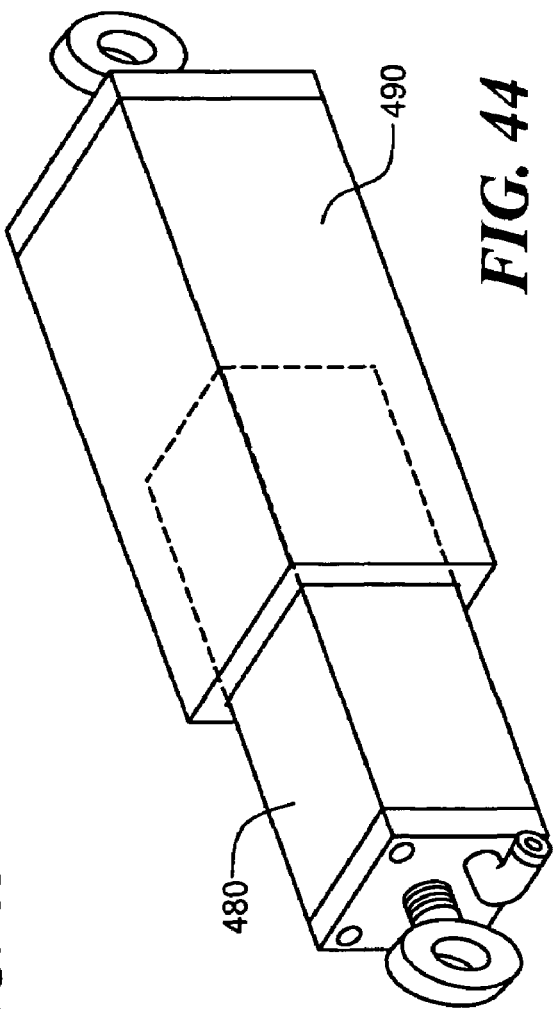
FIG. 44 is a schematic three-dimensional view of a version of a linear reluctance motor in accordance with the subject invention similar to FIGS. 16–18.
Figure 45:
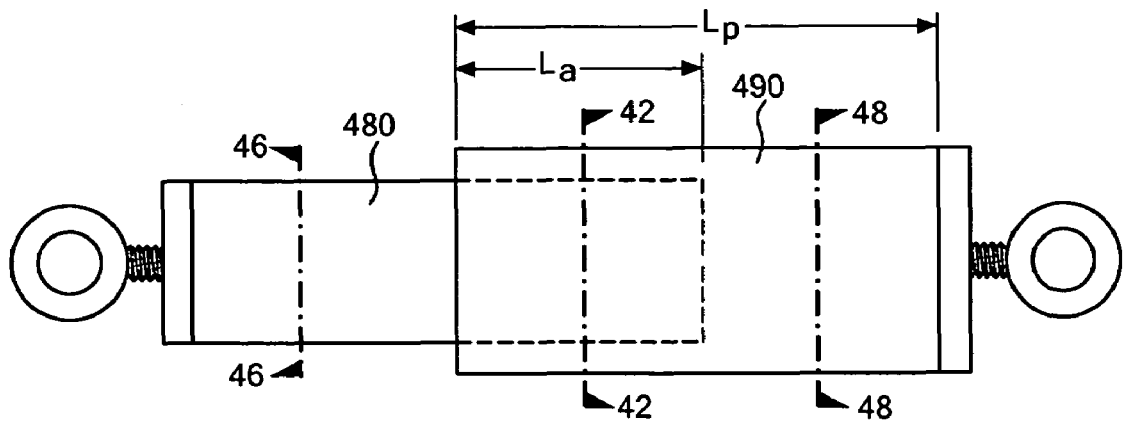
FIG. 45 is a side view of the linear reluctance motor shown in FIG. 44.
Figure 46:
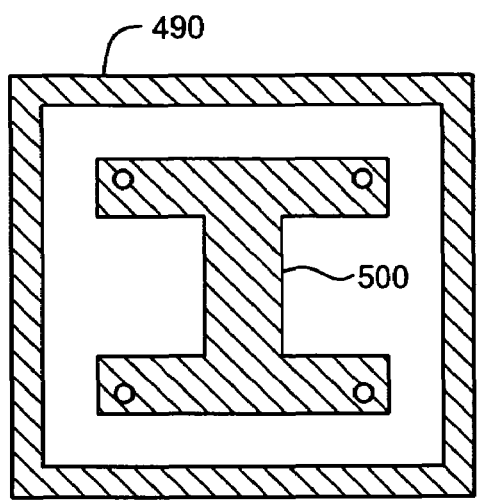
FIG. 46 is a schematic cross-sectional view taken along line 46—46 of FIG. 45.
Figure 47:
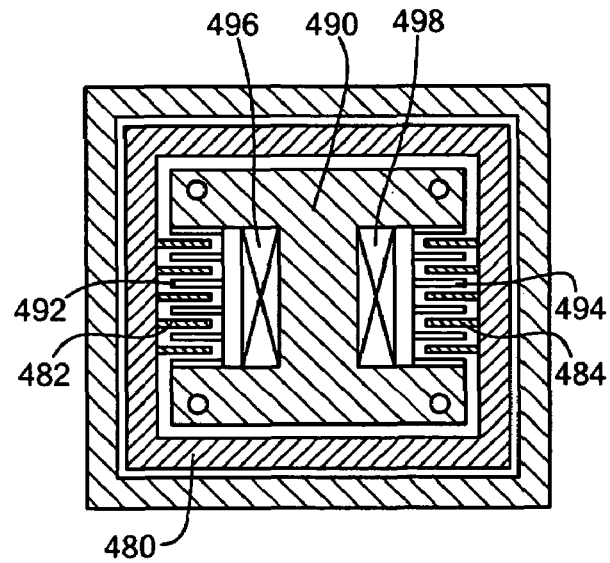
FIG. 47 is a schematic cross-sectional view taken along line 47—47 of FIG. 45.
Figure 48:
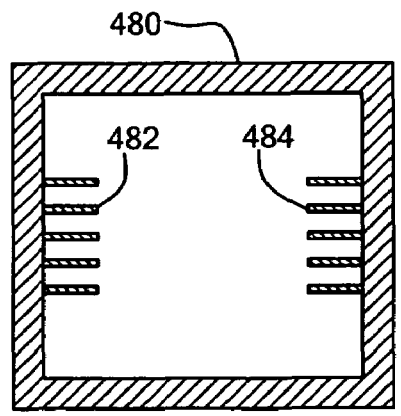
FIG. 48 is a schematic cross-sectional view taken along line 48—48 of FIG. 45.

FIGS. 40, 42 and 43 shown passive shuttle 400 and active stator 402 both of which move in the direction of actuation axis 404.

The result is a linear motor having a long passive shuttle and a short active stator. FIG. 40 shows the shuttle 400 the stator 402, and the direction of motion 404.

FIG. 43 shows how the three phases are arranged serially along the axis 404, separated by structural spacers 407 and 408. Stator tube 405 connects the active part 406 of the stator to the stator end cap 409, FIG. 40. and mounting feature 410. FIG. 43 also shows the passive shuttle blades 411 which run the full length of the shuttle. These blades are stiffened by a structural, non-magnetic I-beam 412 which is attached to the shuttle end cap 413, which, in turn, connects to the tubular shuttle housing 414.

Figure 41:
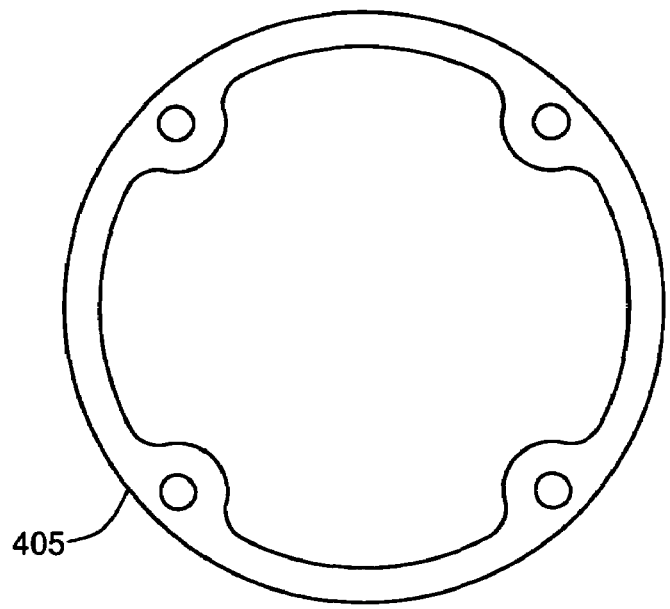
FIG. 41 is a sectional view of the structural tube supporting the active component of the motor of FIG. 40.

FIG. 41 shows a cross-section of stator tube 405. This is cross-section along line 41—41 of FIG. 40. FIG. 42 shows cross-section along line 42—42 of FIG. 40, through the active part of the stator. Unlike the previous embodiments, this one uses two coils (415 and 416) per phase, and the coils are external to the blade-sets. This arrangement directs the flux as shown by the flux arrows (417). The poles 418 of the flux return face inward, thus minimizing the magnetic field outside the motor. This is desirable since it minimizes electromagnetic interference and the detectability (e.g. by a magnetic sensitive explosive mine). By energizing coils 415 and 416 with the right polarity, no flux crosses the web 419 of I-beam 416, thus contributing to maximum force-density of the motor.

The flux return 420 is preferably made from laminated ferromagnetic material. As shown in FIG. 42, the outside of the flux return makes a complete circle. This is structurally advantageous, but not magnetically necessary since the annular web 421 of the flux return carries no useful flux. An alternate design would be for the flux return to be anchored to the inner surface of an additional structural tube attached to the stator tube 405, or, tube 405 could extend the full length of the stator and the flux-returns of phases A, B, and C could attach to the inner diameter.

FIGS. 44–48 show passive shuttle 480 with opposing inwardly facing blade sets 482 and 484 and active stator 490 with opposing outwardly facing blade sets 492 and 494 and coil 496 and 498. Structural I-beam 500, FIG. 46 supports the active part of the stator similar to the embodiment of FIGS. 16–18.

Figure 49:
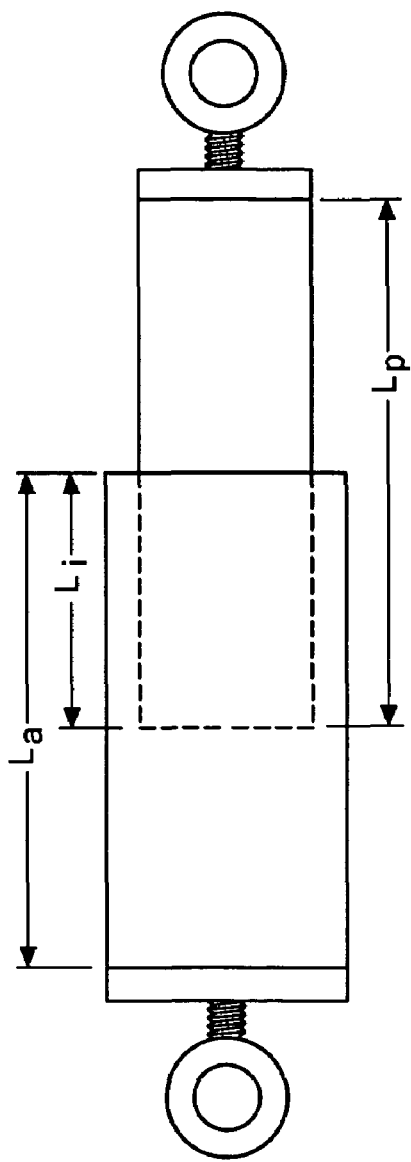
FIG. 49 is a schematic side view of another version of a linear reluctance motor in accordance with the subject invention.

FIG. 49 shows a linear motor having an active part of length La, a passive part of length Lp, and an interleaved or overlapping section of length Li. Unlike the previous embodiments, the length Li changes as the shuttle extends, and consequently, the force capability is not constant. This embodiment is advantageous when maximum force is needed in the retracted position and less force as the shuttle extends.

Figure 50:
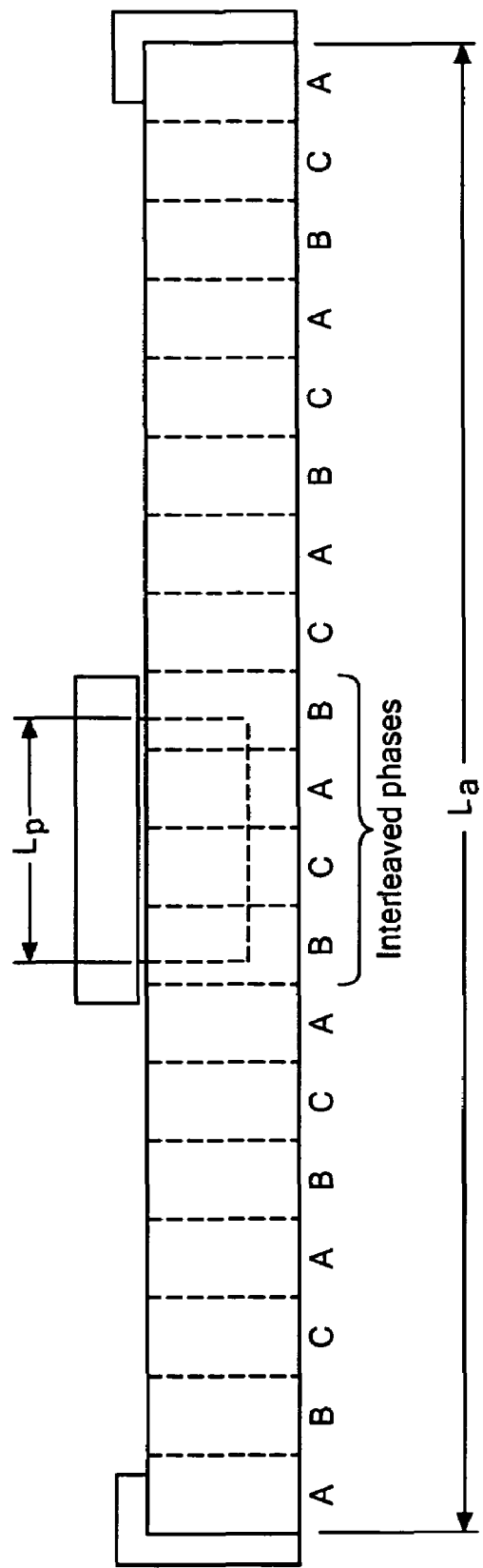
FIG. 50 is a schematic side view of a linear reluctance motor having a short passive shuttle and a long active stator.

FIG. 50 shows one preferred embodiment when the shuttle is much shorter than the stator and electrical connections to the shuttle are to be avoided. In this case, the stator has a large number of phases, which are arranged serially down the length of the stator. The cross-section through the shuttle could resemble the configuration of FIG. 4 with the shuttle having a single set of passive blades. To allow smooth force in either direction, the shuttle blade-set should overlap a minimum of three phases of the stator.

In FIG. 50 the phases of the stator are marked A, B, C, A, B, C etc. Preferably, all these phases marked "A" should have their blade teeth in phase with each other, meaning the distance between the left edge of any two magnetic teeth is an integer multiple of the tooth pitch. Similarly, the teeth of all phases marked B should be "in phase" with each other, and the same for those phases marked "C". As shown in FIG. 7, phases A, B, and C are also "phase-shifted" by P/3 with respect to each other.

Figure 51:
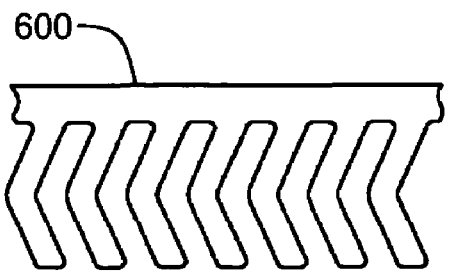
FIG. 51 is a schematic side view of a non-magnetic metal blade coupon portion in accordance with the subject invention.
Figure 52:
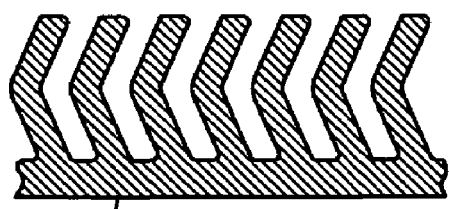
FIG. 52 is a schematic side view of a high permeability material blade coupon in accordance with the subject invention.
Figure 53:
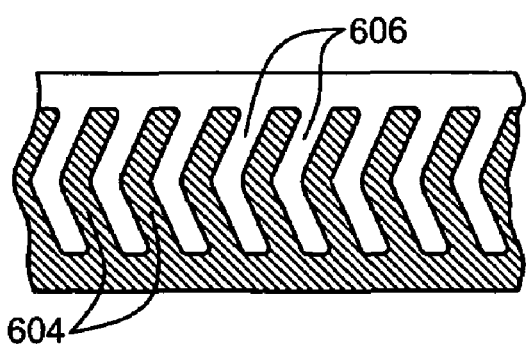
FIG. 53 is a schematic side view showing a complete blade when the blade coupon of FIG. 51 is bonded to the blade coupon of FIG. 52.

FIGS. 51—53 show how chevron-shaped blade teeth can be formed by bonding non-magnetic blade coupon 600, FIG. 51 with high permeability blade coupon 602, FIG. 52 as shown in FIG. 53 to produce high permeability bent teeth 604 alternating with low permeability bent teeth 606. Preferably, the bond between the two blade coupons should be non-conductive so as to minimize the cross-section of the blade subject to circulating eddy-currents. The teeth may be continuous, discontinuous, curved, straight or with one or more zig-zags, or any combination of these shapes, as may be beneficial to improve the strength of the blades, provide a low-friction sliding surface, or increase the effective tooth pitch without increasing the tooth width.

Figure 54:
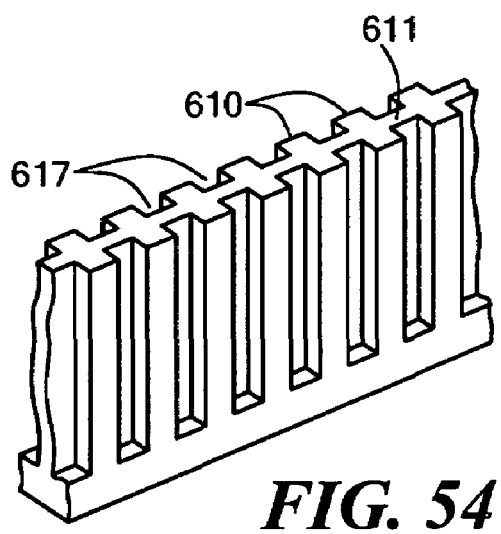
FIG. 54 is a schematic three-dimensional view of a blade coupon with lateral grooves in accordance with the subject invention.
Figure 55:
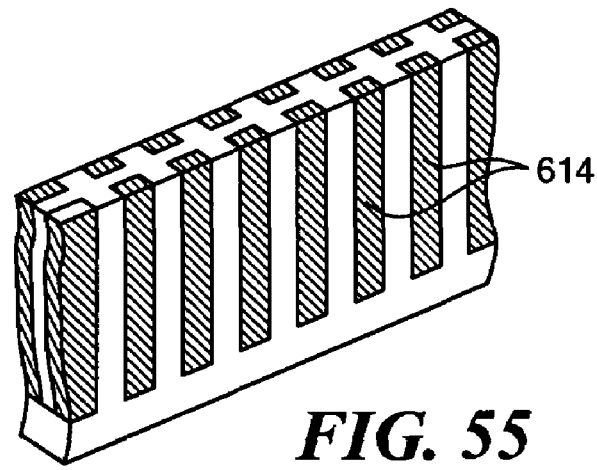
FIG. 55 is a schematic three-dimensional view showing a blade with lateral grooves which have been filled with low permeability structural material.

FIGS. 54 shows how alternating high permeability teeth 610 and low permeability teeth 617 can be achieved by forming grooves in a low-permeability material, but leaving a web 611 of material for structural support. In a non-contact design as in FIG. 8, the grooves could remain unfilled, but for greater strength and for contacting designs it is preferable to fill the grooves with a low-permeability material 614 as shown in FIG. 55.

Figure 56:
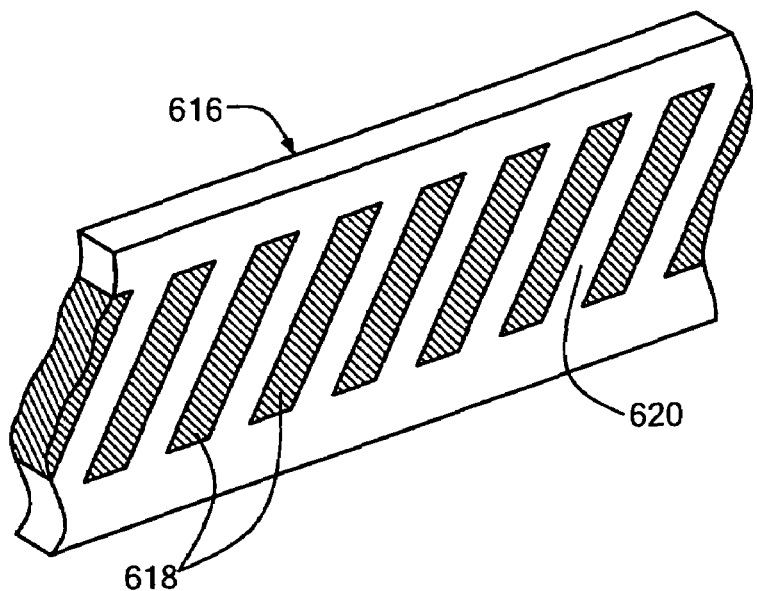
FIG. 56 is a schematic three-dimensional view of a portion of a blade in accordance with the subject invention where the teeth thereof are angled.

In FIG. 56, structural non-magnetic non-conductive blade coupon 616 includes angled slots filled with high permeability material forming angled high permeability teeth 618 and angled low permeability teeth 620. The result is teeth angled with respect to a line perpendicular to the long axis of the blade thus reducing tensile stress in the low permeability material in applications where the load is primarily in one direction. Angled teeth can also be chevron shaped as shown in FIGS. 51–53 or zig-zig in shape, curved, or any combination of these shapes.

Figure 57:
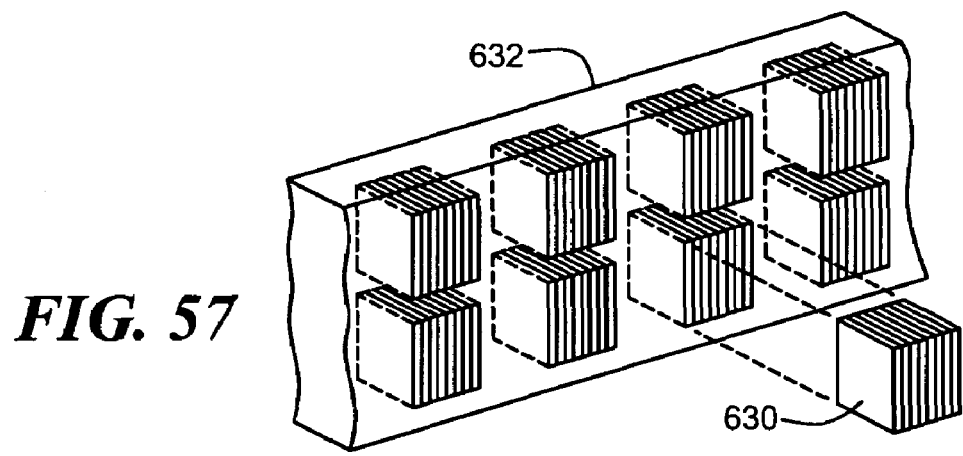
FIG. 57 is a schematic three-dimensional view of a portion of a blade in accordance with the subject invention wherein the teeth are formed by bars of laminated ferromagnetic material bonded in place within a blade coupon.

FIG. 57 shows how bars 630 of laminated ferromagnetic material (e.g., iron) can be bonded into the slots formed in non-magnetic, non-conductive blade coupon 632. Each bar is made of laminated ferromagnetic material thus allowing higher speed operation with reduced eddy-current losses.

Figure 58:
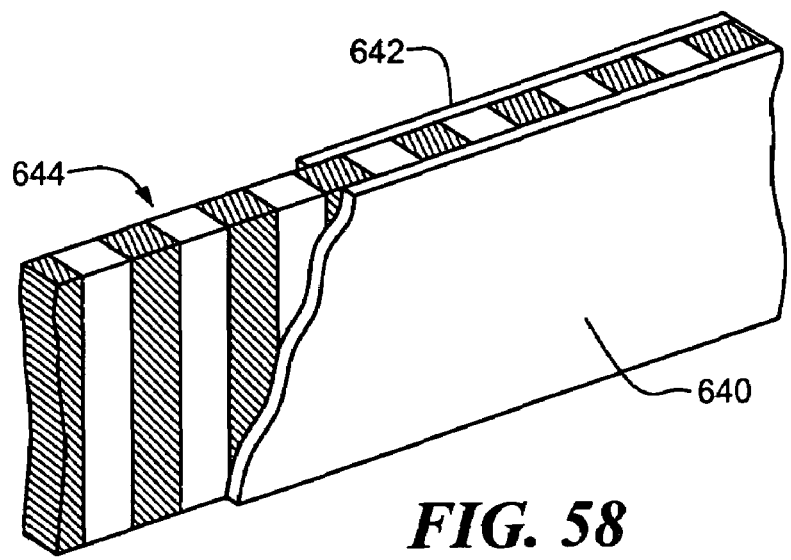
FIG. 58 is a schematic three-dimensional view showing a portion of a blade in accordance with the subject invention with laminated thin structural sheet material bonded to each side thereof.

In any embodiment, thin structural sheet material (e.g., titanium, carbon steel, alloy steel, stainless steel, carbon-fiber reinforced polymer, glass fiber reinforced polymer, polymer film, liquid crystal polymer film, ceramic, or glass) 640 and 642, FIG. 58 can be laminated on the opposite sides of blade 644 to increase the strength of the blades and/or reduce friction and wear.

Thus, depending on the specific application, the shuttle and/or the stator can be active and the shuttle and/or the stator can move. The shuttle can be relatively long and the stator relatively short or the stator can be relatively long and the shuttle relatively short. The shuttle can ride along a C-shaped channel defined by the stator or the shuttle and the stator can define telescoping tubes.

Therefore, although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims:

What is claimed is:

1. A linear reluctance motor having an actuation axis, the linear reluctance motor comprising:
    a stator including a set of spaced blades each extending in the direction of the actuation axis, each blade including a plurality of alternating low permeability and high permeability teeth;
    a shuffle also including a set of spaced blades each extending in the direction of the actuation axis interleaved with the blades of the stator, each blade of the shuttle also including a plurality of alternating low permeability and high permeability teeth; and
    an active component associated with either the stator, the shuttle, or both, the active component divided into at least N phases, each phase including a set of blades, a flux return portion, and a coil wound around the flux return portion to produce flux through the sets of interleaved blades in a direction substantially transverse to the actuation axis, wherein the set of blades is substantially electrically isolated from current supplied to the linear reluctance motor such that substantially no flux is generated by the set of blades.

2. The linear reluctance motor of claim 1 in which N is at least three.

3. The linear reluctance motor of claim 1 in which the stator defines a housing with a channel for receiving the shuttle therein.

4. The linear reluctance motor of claim 3 in which the channel is C-shaped.

5. The linear reluctance motor of claim 3 in which the channel is fully enclosed.

6. The linear reluctance motor of claim 3 in which the shuttle is telescopingly received in the stator.

7. The linear reluctance motor of claim 1 in which the phases are in series along the actuation axis.

8. The linear reluctance motor of claim 1 in which the phases are arranged laterally with respect to the actuation axis.

9. The linear reluctance motor of claim 1 in which the phases are arranged both axially and laterally with respect to the actuation axis.

10. The linear reluctance motor of claim 1 in which there is a large gap between the interleaved blades.

11. The linear reluctance motor of claim 1 in which there is a small gap between the interleaved blades.

12. The linear reluctance motor of claim 1 in which the active component is associated with the stator and the phases are in series along the actuation axis.

13. The linear reluctance motor of claim 12 in which the stator defines a housing with a channel for receiving the shuttle therein, the blades of the shuttle extend into the channel and the blades of the stator are interleaved with the blades of the shuttle.

14. The linear reluctance motor of claim 13 in which the shuttle includes a blade carrier accessible outside the channel.

15. The linear reluctance motor of claim 14 further including a bearing assembly between the blade carrier and the stator housing.

16. The linear reluctance motor of claim 13 in which there is a large gap between the outermost blades of the shuttle and the flux return portion.

17. The linear reluctance motor of claim 13 in which the large gap is effected by tapered side walls of the shuttle housing.

18. The linear reluctance motor of claim 13 in which the blades of the stator and the blades of the shuttle are flexible in lateral bending and closely spaced.

19. The linear reluctance motor of claim 13 in which the blades of the shuttle are flexible and closely spaced to the blades of the stator.

20. The linear reluctance motor of claim 19 in which the blades of the shuttle have a thinned blade root.

21. The linear reluctance motor of claim 19 in which the blades of the shuttle have a slotted blade root.

22. The linear reluctance motor of claim 1 in which the active component is associated with the stator which has, for each phase, an opposing set of blades, a coil therebetween, and a flux return plate.

23. The linear reluctance motor of claim 22 in which the phases are arranged in series along the actuation axis.

24. The linear motor of claim 23 in which the stator includes a housing surrounding the blades and the flux return plates and the shuttle includes a housing telescopingly received in the stator housing.

25. The linear reluctance motor of claim 1 in which the active component is associated with the shuttle and the phases are arranged in series along the actuation axis.

26. The linear reluctance motor of claim 25 in which the stator defines a housing with a channel for receiving the shuttle therein, the blades of the stator extend into the channel, and the blades of the shuttle are interleaved with the blades of the stator.

27. The linear reluctance motor of claim 26 in which the stator housing includes a longitudinal slot and the shuttle includes a fin extending through the slot connected to a driving element located outside the channel.

28. The linear reluctance motor of claim 1 in which the active component is associated with the stator and the phases are arranged laterally.

29. The linear reluctance motor of claim 28 in which the stator defines a housing with a channel for receiving the shuttle therein, the blade sets of the stator are adjacent each other across the channel, and the blade sets of the shuttle are adjacent each other across the channel.

30. The linear reluctance motor of claim 29 in which the blade sets of the shuttle extend into the channel from a carrier.

31. The linear reluctance motor of claim 30 further including a sliding shutter attached to the carrier for sealing the channel of the stator.

32. The linear reluctance motor of claim 1 in which the active component is associated with the shuttle which includes phases distributed axially and laterally.

33. The linear reluctance motor of claim 32 in which the stator includes a housing defining a channel therein, and at least a pair of adjacent blade sets opposing another pair of adjacent blade sets.

34. The linear reluctance motor of claim 33 in which the shuttle includes at least a first pair of adjacent blade sets opposing a second pair of adjacent blade sets defining two phases and a third pair of adjacent blade sets opposing a fourth pair of adjacent blade sets defining two additional phases.

35. The linear reluctance motor of claim 1 in which the active component is associated with the shuttle which travels within the stator and connected to a carriage external to the stator by a cable and pulley subsystem.

36. The linear reluctance motor of claim 1 in which the stator is active and includes phases in series along the actuation axis and the shuttle is telescopingly received in the stator.

37. The linear reluctance motor of claim 1 in which the stator has a set of opposing outwardly extending blades for each phase and the shuttle has a-sets a set of opposing inwardly extending blades.

38. The linear reluctance motor of claim 1 in which the teeth are straight.

39. The linear reluctance motor of claim 1 in which the teeth are angled.

40. The linear reluctance motor of claim 1 in which each tooth is a laminate construction.

41. The linear reluctance motor of claim 1 in which each blade is formed from a low permeability material and the high permeability teeth are formed by adding high permeability material to the low permeability material of the blade.

42. The linear reluctance motor of claim 1 in which each blade is formed from a high permeability material and the low permeability teeth are formed by adding low permeability material to the high permeability material of the blade.

43. The linear reluctance motor of claim 1 in which each blade includes a reinforcing layer on the outside thereof.

44. The linear reluctance motor of claim 1 in which each blade includes a high permeability coupon bonded to a low permeability coupon.

45. The linear reluctance motor of claim 1 further including vacuum compensation means for allowing the shuttle to be actuated without contaminating the blades.

46. The linear reluctance motor of claim 1 in which the active component is associated with the stator, the stator is attached to a structural tube, the blades of the shuttle connect to a structural beam, said beam is attached at the end to a tubular housing which is telescopingly connected to said structural tube, and said tubular housing is external to said structural tube.

47. The linear reluctance motor of claim 1 in which at least one phase is divided into at lease two magnetic circuits, each circuit having a coil, a flux-return a blade-set, said flux-returns being inwardly opposed so as to minimize leakage flux.

48. The linear reluctance motor of claim 1 in which the length of the interleaved portion of the stator and shuttle blades changes as the shuttle moves.

49. The linear reluctance motor of claim 1 in which the shuttle is relatively short and the stator long, the active component is associated with the stator, the blades of shuttle substantially overlap at least three phases, and the stator has more phases than can be engaged by the shuttle at any given position.

50. The linear reluctance motor of claim 1 in which the interleaved blades define an average gap between the blades and an outer gap.

51. The linear reluctance motor of claim 50 in which the outer gap is larger than the average gap.

52. The linear reluctance motor of claim 51 in which the outer gap is between the outer blades of the shuttle and the outer blades of the stator.

53. The linear reluctance motor of claim 51 in which the outer blades of the shuttle are flexible in lateral bending.

54. The linear reluctance motor of claim 53 in which the outer gap is between the outer blades of the stator and the flux return portions.

55. The linear reluctance motor of claim 54 in which the flux return portion tapers outwardly away from the outer blades of the stator.

56. The linear reluctance motor of claim 1 in which the blades of the shuttle and/or the stator have a thinned blade root or a slotted blade root.

57. The linear reluctance motor of claim 1 in which the stator defines a housing with a longitudinal slot and the shuttle includes a fin extending through the slot.

58. The linear reluctance motor of claim 1 in which the stator defines a channel and further including a sliding shutter for sealing the channel of the stator.

59. The linear reluctance motor of claim 1 in which the shuttle is telescopingly received in the stator.

60. The linear reluctance motor of claim 59 in which the active component is supported by a structural beam.

61. The linear reluctance motor of claim 1 in which the shuttle and the stator define inner and outer telescoping tubes, the inner tube connected to the active component and the passive blades connected to a structural beam connected on one end to the outer tube.

62. The linear reluctance motor of claim 1 further including at least one push rod extending from the shuttle.

63. The linear reluctance motor of claim 1 further including a tension element connected to the shuttle.

64. The linear reluctance motor of claim 1 in which the shuttle is shorter than the stator.

65. The linear reluctance motor of claim 1 in which the shuttle is longer than the stator.

66. The linear reluctance motor of claim 1 further including conductors for powering the coils.

67. The linear reluctance motor of claim 66 in which the conductors are stationary with respect to the active component.

68. The linear reluctance motor of claim 66 in which the conductors are extensible.

69. A linear reluctance motor having an actuation axis, the linear reluctance motor comprising:

a stator divided into N phases in sets, each phase including a set of opposing spaced blades extending in the direction of the actuation axis and outwardly towards a stator housing, the set of blades being substantially electrically isolated from current supplied to the linear reluctance motor such that substantially no flux is generated by the set of blades, each phase including:
a flux return plate; and a coil wound around the flux return plate to produce flux in a direction substantially transverse to the actuation axis; and a shuttle including a set of opposing spaced blades extending in the direction of the actuation axis and inwardly from a shuttle housing to interleave with the blades of the stator;

the shuttle housing telescopingly received in the stator housing.

70. The reluctance motor of claim 69 in which N is at least three.

71. A linear reluctance motor having an actuation axis, the linear reluctance motor comprising:

a stator including a set of spaced blades each extending in the direction of the actuation axis, each blade including a plurality of alternating low permeability and high permeability teeth;

a shuttle also including a set of spaced blades each extending in the direction of the actuation axis interleaved with the blades of the stator, each blade of the shuttle also including a plurality of alternating low permeability and high permeability teeth; and an active component associated with the stator, the active component divided into at least N phases in series, each phase including a set of blades, a flux return portion, and a coil wound around the flux return portion to produce flux through the sets of interleaved blades in a direction substantially transverse to the actuation axis, wherein the set of blades is substantially electrically isolated from current supplied to the linear reluctance motor such that substantially no flux is generated by the set of blades, the stator defining a housing with a channel for receiving the shuttle therein, the blades of the shuttle extending into the channel and the blades of the stator interleaved with the blades of the shuttle.

72. A linear reluctance motor having an actuation axis, the linear reluctance motor comprising:

a stator including a set of spaced blades each extending in the direction of the actuation axis, each blade including a plurality of alternating low permeability and high permeability teeth;

a shuttle also including a set of spaced blades each extending in the direction of the actuation axis interleaved with the blades of the stator, each blade of the shuttle also including a plurality of alternating low permeability and high permeability teeth; and an active component associated with the shuttle, the active component divided into at least N phases in series, each phase including a set of blades, a flux return portion, and a coil wound around the flux return portion to produce flux through the sets of interleaved blades in a direction substantially transverse to the actuation axis, wherein the set of blades is substantially electrically isolated from current supplied to the linear reluctance motor such that substantially no flux is generated by the set of blades, the stator defining a housing with a channel for receiving the shuttle therein, the blades of the stator extending into the channel and the blades of the shuttle interleaved with the blades of the stator.

73. A linear reluctance motor having an actuation axis, the linear reluctance motor comprising:

a stator including a set of spaced blades each extending in the direction of the actuation axis, each blade including a plurality of alternating low permeability and high permeability teeth;

a shuttle also including a set of spaced blades each extending in the direction of the actuation axis interleaved with the blades of the stator, each blade of the shuttle also including a plurality of alternating low permeability and high permeability teeth; and an active component associated with the stator, the active component divided into at least N phases arranged laterally, each phase including a set of blades, a flux return portion, and a coil wound around the flux return portion to produce flux through the sets of interleaved blades in a direction substantially transverse to the actuation axis, wherein the set of blades is substantially electrically isolated from current supplied to the linear reluctance motor such that substantially no flux is generated by the set of blades, the stator defining a housing with a channel for receiving the shuttle therein, the blade sets of the stator adjacent each other across the channel, and the blade sets of the shuttle adjacent each other across the channel.

74. A linear reluctance motor having an actuation axis, the linear reluctance motor comprising:

a stator including a set of spaced blades each extending in the direction of the actuation axis, each blade including a plurality of alternating low permeability and high permeability teeth;

a shuttle also including a set of spaced blades each extending in the direction of the actuation axis interleaved with the blades of the stator, each blade of the shuttle also including a plurality of alternating low permeability and high permeability teeth;

an active component associated with the shuttle, the active component divided into at least N phases distributed axially and laterally, each phase including a set of blades, a flux return portion, and a coil wound to produce flux through the sets of interleaved blades in a direction substantially transverse to the actuation axis;

the stator including a housing defining a channel therein, and at least a pair of adjacent blade sets opposing another pair of adjacent blade sets; and the shuttle including at least a first pair of adjacent blade sets opposing a second pair of adjacent blade sets defining two phases and a third pair of adjacent blade sets opposing a fourth pair of adjacent blade sets defining two additional phases.

* * * * *

UNITED STATES PATENT AND TRADEMARK OFFICE
CERTIFICATE OF CORRECTION

| | | |
|---|---|---|
| PATENT NO. | : 7,218,019 B2 | Page 1 of 1 |
| APPLICATION NO. | : 10/726420 | |
| DATED | : May 15, 2007 | |
| INVENTOR(S) | : Steven D. Potter | |

It is certified that error appears in the above-identified patent and that said Letters Patent is hereby corrected as shown below:

Column 16, line 31 "a shuffle also including a set of spaced blades each" should read --a shuttle also including a set of spaced blades each--

Signed and Sealed this

Twenty-fourth Day of February, 2009

JOHN DOLL
*Acting Director of the United States Patent and Trademark Office*